United States Patent
Ouchi et al.

(10) Patent No.: US 6,987,546 B2
(45) Date of Patent: Jan. 17, 2006

(54) PROJECTION TYPE IMAGE DISPLAY APPARATUS

(75) Inventors: Satoshi Ouchi, Kamakura (JP); Masahiko Yatsu, Fujisawa (JP); Koji Hirata, Yokohama (JP); Futoshi Yamasaki, Yokohama (JP); Tomohiro Miyoshi, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 539 days.

(21) Appl. No.: 10/292,537

(22) Filed: Nov. 13, 2002

(65) Prior Publication Data

US 2003/0169376 A1    Sep. 11, 2003

(30) Foreign Application Priority Data

Mar. 7, 2002 (JP) .............................. 2002-062383

(51) Int. Cl.
*H04N 9/31* (2006.01)
(52) U.S. Cl. ...................................... 348/744; 348/781
(58) Field of Classification Search ................ 348/744, 348/781, 782, 750, 756, 757, 759; 359/201, 359/204, 212, 216, 223, 209, 211, 634, 649, 359/636, 640, 619; 353/31, 34, 37; 349/7, 349/8, 5; H04N 9/31, 5/64
See application file for complete search history.

(56) References Cited

U.S. PATENT DOCUMENTS

| 5,528,318 | A | 6/1996 | Janssen |
| 5,845,981 | A | 12/1998 | Bradley |
| 6,219,110 | B1 | 4/2001 | Ishikawa et al. |
| 6,288,815 | B1 | 9/2001 | Lambert |
| 6,493,149 | B2 * | 12/2002 | Ouchi ...................... 359/634 |
| 6,765,705 | B2 * | 7/2004 | Ouchi ...................... 359/216 |
| 6,898,020 | B2 * | 5/2005 | Ouchi ...................... 359/634 |
| 2003/0164901 | A1 * | 9/2003 | Ouchi et al. ................ 348/744 |

* cited by examiner

*Primary Examiner*—Sherrie Hsia
(74) *Attorney, Agent, or Firm*—McDermott Will & Emery LLP

(57) ABSTRACT

An image display technique which projects R, G, and B light rays on a display device to form an image with an increased utilization ratio of light and an increased screen brightness. R, G, and B light rays as a result of color separation are reflected by plural reflective surfaces on the inner side, etc. of a rotary polyhedral reflector, so that, as the reflector rotates around a central axis and its reflection plane sequentially changes from one reflective surface to a next one, the reflected light rays are projected on a display device surface in different positions and scroll in a prescribed direction.

19 Claims, 12 Drawing Sheets

PROJECTION TYPE IMAGE DISPLAY APPARATUS

BACKGROUND

The present invention relates to an image display technique which separates light from a light source into light rays of colors (R, G, B) and throws them on a display device to form an image.

In conventional image display techniques of this type, R, G, and B light rays thrown on a display device individually are sequentially moved, or scrolled where light from a light source passes through a lens array and is converted into polarized light in a specific state by a polarization converter and then separated into R, G, and B light rays by dichroic mirrors; the optical paths of the R, G, and B light rays are changed by corresponding rotary prisms so that the rays are projected on the surface of a display device such as a liquid crystal panel in different positions and scroll in a prescribed direction on the display device.

In the above prior art, the overall size and cost of an optical system or apparatus tend to be considerable due to the use of plural rotary prisms and the use of many lenses, which means the presence of many light-transmitting parts, is likely to cause light loss and a decline in screen brightness. Besides, the positions of R, G, and B light projection spots on the display device must be adjusted by controlling the rotational position of the above plural rotary prisms. This adjustment work is usually troublesome. In addition, a motor should be installed for each of the rotary prisms, which may increase the noise level.

SUMMARY

In the prior art, for example, there are following three problems to be improved. The first one is to increase the utilization ratio of light and improve screen brightness. The second one is to prevent an increase in the overall size and cost of the optical system or apparatus. The third one is to eliminate the need for adjustment of R, G, and B light projection spots.

In order to solve the problems, basically, R, G, and B light rays as a result of color separation are reflected by plural reflective surfaces formed on the inner side, etc. of a rotary polyhedral reflector, which is rotating around a central axis, while the reflection plane changes from one reflective surface to a next one, so that the reflected light rays are projected on a display device surface in different positions and scroll in a prescribed direction. Specifically, an optical unit for an image display apparatus forms an optical image according to an image signal by projecting light from a light source on a display device using an illumination optical system. Here, the illumination optical system includes: color separator (5, 5a, 5b, 5a, 5a1, 5b1, 5c1 in relevant embodiments) which separates light from the light source into R, G, and B light rays; and a rotary polyhedral reflector (7, 7' in relevant embodiments) which has plural reflective surfaces (7a, 7b, 7c, 7d, 7e, 7f, 7g, 7h, 7'a, 7' b, 7'c, 7'd, 7'e, 7'f, 7'g, 7'h in relevant embodiments) around a central axis, with the angle formed by neighboring reflective surfaces or neighboring reflective surface tangents smaller than 180 degrees on the light entrance/exit side, and, while rotating around the central axis, makes the reflective surfaces reflect the R, G, and B light rays sequentially, and sends them to the display device. As the rotary polyhedral reflector rotates and the reflection plane thereof sequentially changes from one reflective surface to a next one, R, G, and B light rays thrown on the display device from the rotary polyhedral reflector scroll in a prescribed direction on the device.

Additional objects, advantages and novel features of the embodiments will be set forth in part in the description which follows, and in part will become apparent to those skilled in the art upon examination of the following and the accompanying drawings or may be learned by production or operation of the embodiments. The objects and advantages of the inventive concepts may be realized and attained by means of the methodologies, instrumentalities and combinations particularly pointed out in the appended claims.

BRIEF DESCRIPTION OF THE DRAWINGS

The drawing figures depict preferred embodiments by way of example, not by way of limitations. In the figures, like reference numerals refer to the same or similar elements.

FIG. 8A illustrates a first lens array, FIG. 8B illustrates a second lens array, FIG. 8C explains how the lens arrays work.

DETAILED DESCRIPTION OF THE EMBODIMENTS

Figure 1:
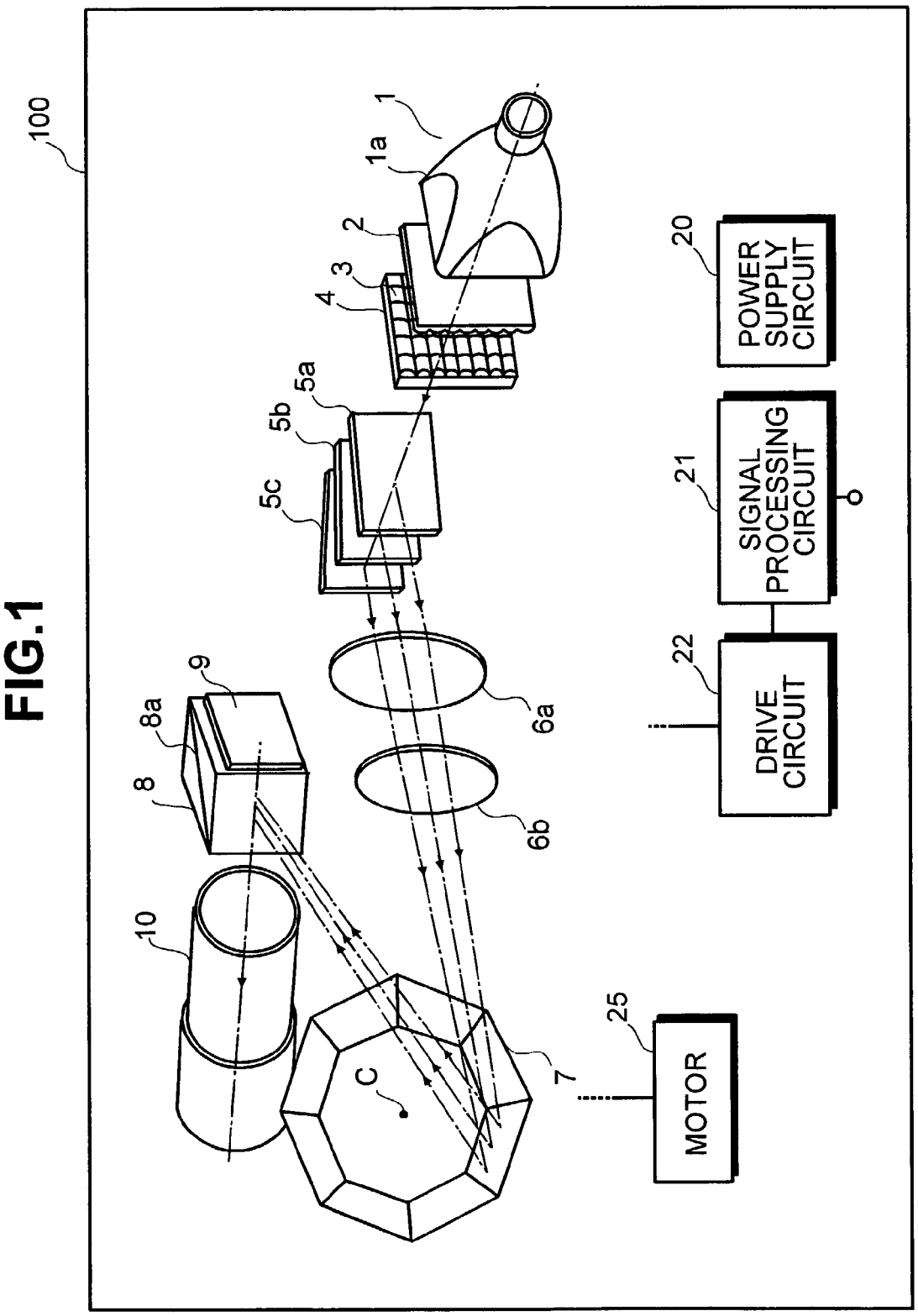
FIG. 1 is an exemplary diagram for illustrating a first embodiment.

Hereinafter, referring to the drawings, the explanation will be given below concerning the embodiments of the present invention.

Figure 2A:
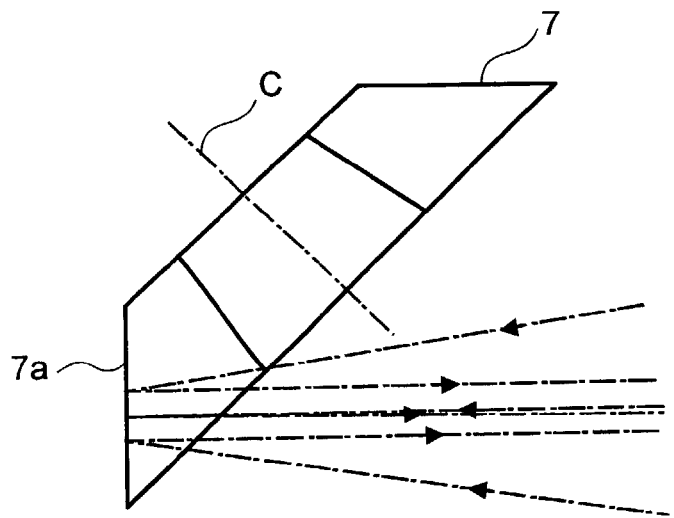
FIG. 2A is an exemplary sectional view of a rotary polyhedral reflector according to the first embodiment.
Figure 2B:
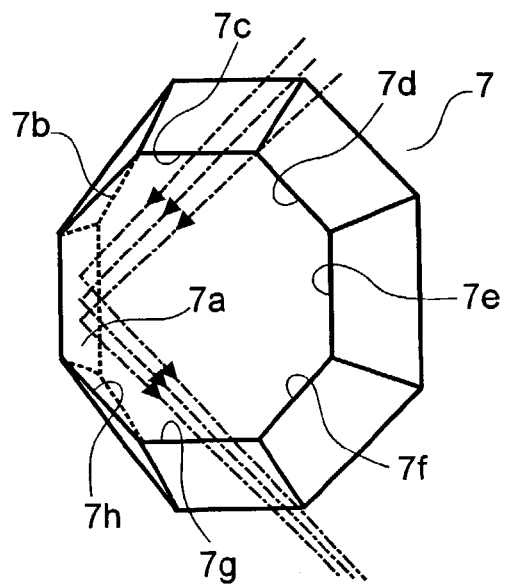
FIG. 2B is an exemplary perspective view of the rotary polyhedral reflector.
Figure 3A:
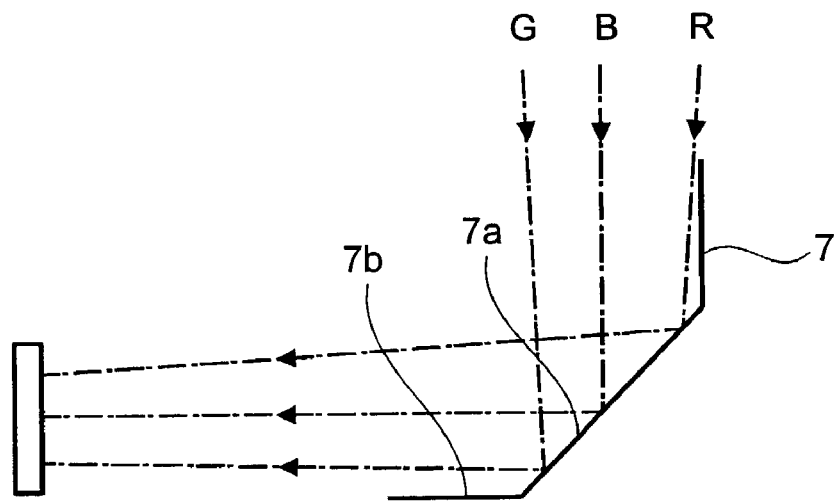
FIG. 3A shows how, according to the first embodiment, the rotary polyhedral reflector in a position reflects R, G, and B light rays while rotating.
Figure 3B:
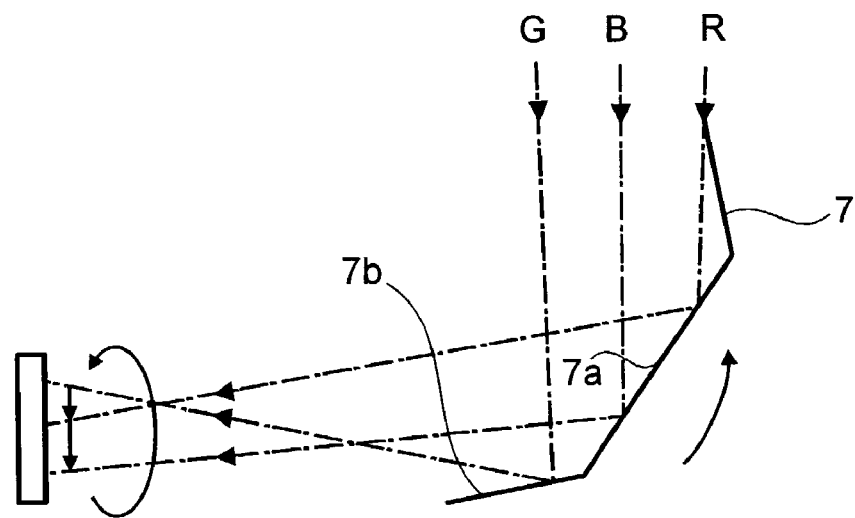
FIG. 3B shows how the rotary polyhedral reflector in another position reflects R, G, and B light rays while rotating.

FIGS. 1 to 3 are explanatory drawings for the first embodiment. FIG. 1 shows the exemplary structure of a projection type image display apparatus as the first embodiment. FIG. 2A and FIG. 2B show the exemplary structure of a rotary polyhedral reflector shown in FIG. 1. FIG. 3A shows how the rotary polyhedral reflector in a position reflects R, G, and B light rays while rotating, and FIG. 3B shows how the rotary polyhedral reflector in another position reflects R, G, and B light rays while rotating.

In the first embodiment, R, G, and B light rays as a result of color separation are once reflected by a rotary polyhedral reflector and projected on a display device.

In FIG. 1, numeral 1 represents a lamp unit including a lamp (not shown) as a light source and 1*a* represents a reflector with an oval, parabolic or aspheric reflective surface which reflects light from the lamp in a given direction. A numeral 2 denotes a first lens array which consists of plural micro condenser lenses and serves as secondary light sources to ensure an even illumination distribution in the beam cross-section. A numeral 3 represents a second lens array which consists of plural micro condenser lenses and makes an image of each lens of the first lens array. A numeral 4 designates a polarization converter which consists of a polarizing beam splitter (PBS) and a half-wave retardation plate and divides light from the second lens array 3 into P polarized light and S polarized light, and rotates either polarized light to make it identical to the other polarized light. Symbols 5*a*, 5*b*, and 5*c* represent dichroic mirrors which color-separate the polarized light by reflection and transmission, as referred to collectively as a color separator. The dichroic mirror 5*a* is a red light reflection dichroic mirror which reflects red light and transmits blue and green light, 5*b* a blue light reflection dichrioic mirror which reflects blue light and transmits green light, and 5*c* a green light reflection dichroic mirror which reflects green light. The dichroic mirrors 5*a*, 5*b*, and 5*c* are not parallel to each other and the positional order is determined based on the spectral characteristics of the lamp, taking the color balance on the image projection surface such as a screen into consideration. Symbols 6*a* and 6*b* represent collimator lenses which collimate R, G, and B light rays coming from the dichroic mirrors. A numeral 7 represents a rotary polyhedral reflector with C as the central axis. A numeral 8 represents a polarizing beam splitter (PBS) and numeral 8*a* represents an analyzing film built in PBS 8, which reflects either of P polarized light and S polarized light and transmits the other. A numeral 9 denotes a reflection type display device (e.g. a reflection type liquid crystal panel) which modulates R, G, and B light rays according to an image signal and emits them. A numeral 10 represents a projector which projects light rays emitted from PBS 8 on a screen in enlarged form. A numeral 20 represents a power supply circuit; 21 a signal processing circuit which processes image signals coming from the outside; and 22 a drive circuit which drives the display device 9 according to signals from the signal processing circuit 21. A numeral 25 represents a motor which rotates the rotary polyhedral reflector 7. A numeral 100 designates an image display apparatus.

The rotary polyhedral reflector 7 has a ring of reflective surfaces on its inner side around the central axis C (facing the central axis C). These reflective surfaces are symmetrical with respect to the central axis C and inclined with respect to the central axis C in its longitudinal direction where the angle formed by neighboring reflective surfaces or the angle formed by neighboring reflective surface tangents is smaller than 180 degrees on the light entrance/exit side. Driven by the motor, the rotary polyhedral reflector 7 rotates around the central axis C at a prescribed velocity and the plural reflective surfaces of the rotary polyhedral reflector 7 sequentially reflect R, G, and B light rays from the collimator lenses 6*a*, 6*b* while rotating around the central axis C and emit them to PBS 8. The R, G, and B light rays from PBS 8 are thrown on the reflection type display device 9. As the rotary polyhedral reflector 7 rotates and the reflection plane thereof changes from one reflective surface to a next one, the R, G, and B light rays thrown on the display device 9 scroll in a prescribed direction on the device 9. The optical system including the above various components from the lamp unit 1 to the projector 10 constitutes an optical unit in an image display apparatus 100 where the optical system portion ranging from the first lens array 2 to PBS 8 serves as an illumination optical system for the reflection type display device 9.

FIG. 2A is an exemplary sectional view of the rotary polyhedral reflector shown in FIG. 1. FIG. 2B is an exemplary perspective view of the rotary polyhedral reflector. The rotary polyhedral reflector 7 has a ring of eight reflective surfaces 7*a*, 7*b*, 7*c*, 7*d*, 7*e*, 7*f*, 7*g*, 7*h* around the central axis C on its inner side. The eight reflective surfaces form an equilateral octagon. The angle formed by neighboring reflective surfaces of the eight ones (i.e. the angle formed by 7*a* and 7*b*, 7*b* and 7*c*, 7*c* and 7*d*, 7*d* and 7*e*, 7*e* and 7*f*, 7*f* and 7*g*, and 7*g* and 7*h*) is approximately 135 degrees. Color light rays reflected by the dichroic mirrors 5*a*, 5*b*, and 5*c* are collimated by the collimator lenses 6*a* and 6*b* and thrown on the reflective surfaces on the inner side of the rotary polyhedral reflector 7 and reflected by them. As the rotary polyhedral reflector 7 rotates, the reflection plane (surface which reflects incident light) sequentially changes from one reflective surface to a next one (7*a*-7*b*-7*c*-7*d*-7*e*-7*f*-7*g*-7*h*) with time and light incident/reflection points and angles on each of the reflective surfaces change accordingly. As the reflection plane changes and the incident/reflection point and angle on each reflective surface change, the direction of reflected light changes and the direction of light emitted to PBS 8 changes with time. Regarding the eight reflective surfaces 7*a*, 7*b*, 7*c*, 7*d*, 7*e*, 7*f*, 7*g*, 7*h*, the angle formed by neighboring reflective surfaces is smaller than 180 degrees, so reflected light rays of different colors do not cross when R, G, and B light rays are reflected on the same reflective surface. The eight reflective surfaces 7*a*, 7*b*, 7*c*, 7*d*, 7*e*, 7*f*, 7*g*, 7*h* may transmit ultraviolet rays and far-infrared rays. The above-mentioned arrangements improve purity of reflected light colors.

FIGS. 3A and 3B illustrate how the rotary polyhedral reflector 7 reflects R, G, and B light rays while it is rotating.

FIGS. 3A and 3B show how the rotary polyhedral reflector 7 shown in FIGS. 1, 2A and 2B reflects light on one of its reflective surfaces. FIG. 3B shows the rotary polyhedral reflector 7 which has been shifted from its former position shown in FIG. 3A or rotated in the direction indicated by the arrow. In FIG. 3A, R, G, and B light rays which have reached the reflective surface 7*a* from the collimator lens 6*b* are reflected by the surface 7*a* and emitted in the indicated direction. Reflected R, G, and B light rays shift from upper position to lower position according to the rotation of the rotary polyhedral reflector 7. As the rotary polyhedral reflector 7 rotates around the central axis C, the positional relation between the reflective surface and the incident light rays becomes as shown in FIG. 3B, where R light and B light remain thrown on and reflected by the reflective surface 7*a* but the reflection (incidence) plane for G light changes from the reflective surface 7*a* to the reflective surface 7*b*. As shown in FIG. 3B, G light ray changes the position on the PBS 8 from the lowest position to the highest position when the reflective surface for G light ray is changed. Similarly, when the rotary polyhedral reflector 7 further rotates around the central axis C and the reflection plane for B light ray changes from the reflective surface 7*a* to the reflective surface 7*b*, B light rays after reflecting on the reflective surface 7*b* becomes to the highest position.

In the first embodiment as demonstrated by FIGS. 1, 2A, 2B, 3A and 3B, light from a lamp (not shown) in the lamp unit 1 is reflected and condensed by the oval, parabolic or aspheric reflective surface of the reflector 1a and sent to the first lens array 2 where plural secondary lamp images appear; then the second lens array 3 forms the plural secondary lamp images which are then divided into P polarized light and S polarized light by the PBS (not shown) of the polarization converter 4, and either polarized light, for example, P polarized light, is rotated by the half-wave retardation plate (not shown) to be converted into S polarized light and combined with the S polarized light resulting from the division by the PBS and emitted from the polarization converter 4. Contrary to the above-mentioned case, the half-wave retardation plate in the polarization converter 4 may rotate the S polarized light as a result of the division by the PBS to convert it into P polarized light so that P polarized light is emitted from the polarization converter 4. The white S polarized light from the polarization converter 4 reaches the dichroic mirrors 5a, 5b, 5c for color separation. First, the red light reflection dichroic mirror 5a reflects the red component (hereinafter called R light) of the incident white S polarized light to separate it from the rest of the light; then the blue light reflection dichroic mirror 5b reflects the blue component (B light) of the incident S polarized light to separate it from the green component; and lastly the green light reflection dichroic mirror 5c reflects the green component (G light). The R, G, and B light rays as color-separated S polarized light are collimated by the collimator lenses 6a and 6b and sent to a reflective surface of the rotary polyhedral reflector 7.

In the rotary polyhedral reflector 7, while it is rotating, the R, G, and B light rays are sequentially reflected by the eight reflective surfaces 7a, 7b, 7c, 7d, 7e, 7f, 7g, 7h on its inner side, and then sent to PBS 8, where the R, G, and B light rays as S polarized light are reflected by the analyzing film 8a and thrown on the reflection type display device 9. The reflection type display device 9, which is driven by the drive circuit according to an image signal, modulates the incoming R, G, and B light rays according to the image signal and emits the S polarized light as reflected light of P polarized light again to PBS 8. In PBS 8, the amount of light emitted to the projector 10 and the amount of light emitted to the lamp side are determined according to the relation between the polarization state of incident P polarized light and PBS 8's polarization axis for transmission and reflection. An image is projected in this way according to the external input image signal. When the display device 9 makes a display in black, the polarization state of outgoing light is almost the same as that of incoming light and the outgoing light is fed back along the incoming light path to the lamp side. The light coming from PBS 8 enters the projector 10. This embodiment assumes that R, G, and B light rays from PBS 8 are all P polarized light. The P polarized light which has entered the projector 10 is projected on a screen, etc. in enlarged form to project an image according to the above-said image signal.

According to this first embodiment, the apparatus is mainly composed of a rotary polyhedral reflector 7 and one display device so that a simple, compact, low-cost optical unit or image display apparatus can be realized. Since reflected light rays of different colors do not cross when R, G, and B light rays are reflected on the same reflective surface in the rotary polyhedral reflector 7, light spots of different colors do not overlap on the display device 9, which eliminates wasted light. If the angle formed by neighboring reflective surfaces is larger than 180 degrees, it is necessary that R, G, B light rays cross each other after reflecting on the same reflective surface to make R, G, B light rays scroll on the same area, and it is necessary for the R, G, and B light spots come close together on the same surface to make R, G, B, light rays cross after reflection. It is highly possible that R, G, B light rays are overlapping if R, G, and B light spots come close together on the same surface. Such overlapping portion comprises black color spot on the image display and black color spot does not contribute to displaying of the image since it does not contribute to the image, the light at such an overlap is essentially wasted. On the contrary, if each angle formed by neighboring reflective surfaces or neighboring reflective surface tangents smaller than 180 degrees on the light entrance/exit side, it is not necessary that R, G, B light rays cross each other after reflecting on the same reflective surface to make R, G, B light rays scroll on the same area, so light spots of different colors do not overlap on the display device 9, which eliminates wasted light. Therefore, the F number of the optical system need not be small and thus the screen brightness can be increased. In this sense, the optical unit or apparatus can also be compact. Also, adjustment of R, G, and B light projection spots on the display device 9 is no longer needed.

Figure 4:
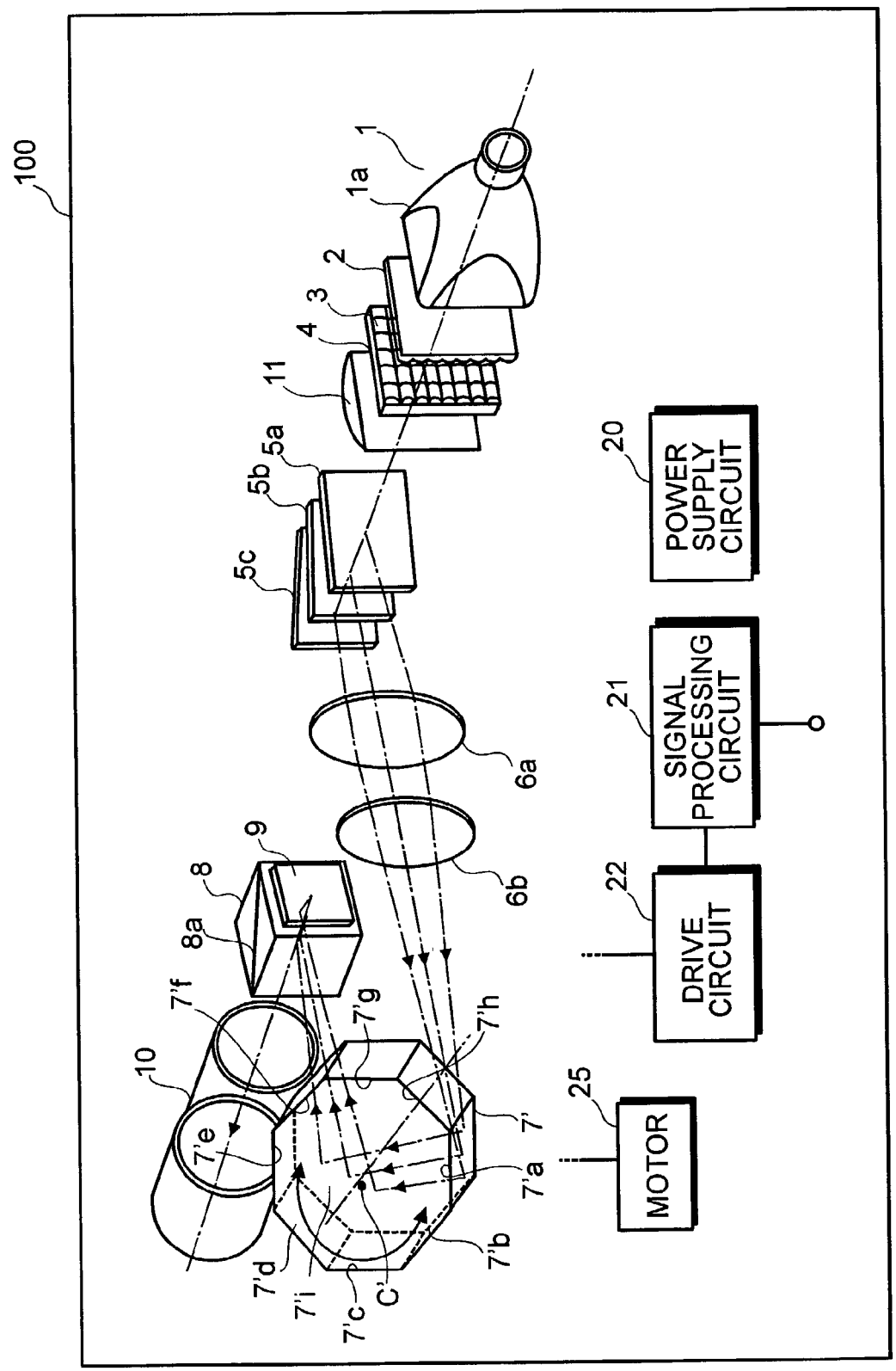
FIG. 4 is an exemplary diagram for illustrating a second embodiment.
Figure 5:
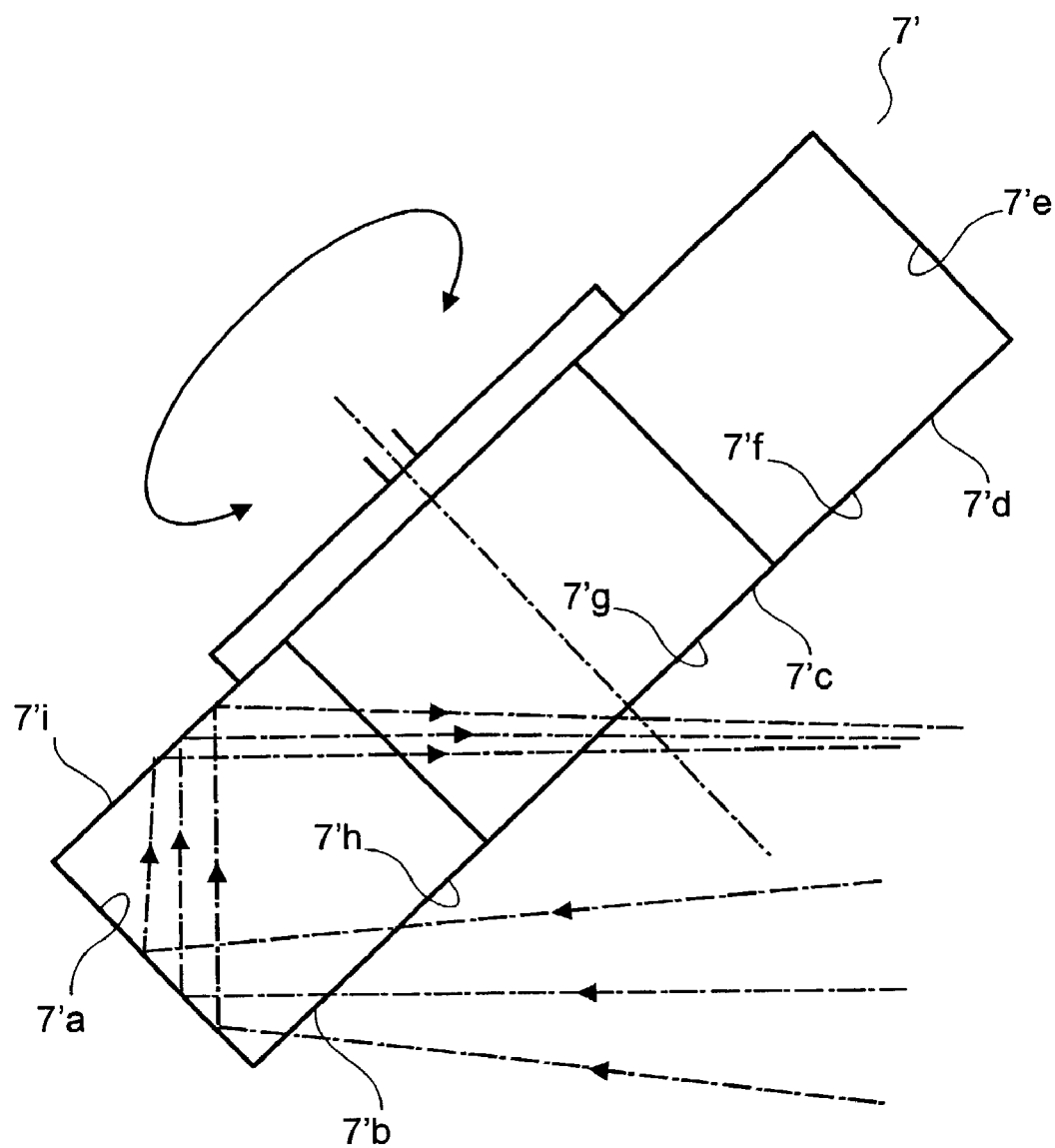
FIG. 5 shows an exemplary structure of a rotary polyhedral reflector according to the second embodiment.

FIGS. 4 and 5 are explanatory drawings for a second embodiment; FIG. 4 shows the exemplary structure of a projection type image display apparatus according to the second embodiment and FIG. 5 shows the exemplary structure of a rotary polyhedral reflector in the apparatus shown in FIG. 4.

In the second embodiment, R, G, and B light rays as a result of color separation are twice reflected by a rotary polyhedral reflector and projected on a display device.

Referring to FIG. 4, numeral 7' represents a rotary polyhedral reflector with C' as the central axis, and 11 represents a cylindrical lens. The other components are the same as those in the above first embodiment.

The rotary polyhedral reflector 7' has a ring of reflective surfaces on its inner side around the central axis C' (facing the central axis C'), as primary reflective surfaces, and has a reflective surface on a plane perpendicular to the central axis C' as a secondary reflective surface. The primary reflective surfaces are symmetrical with respect to the central axis C' and nearly parallel to the central axis C' in the longitudinal direction of the axis, where the angle formed by neighboring reflective surfaces or the angle formed by neighboring reflective surface tangents is smaller than 180 degrees on the light entrance/exit side. The rotary polyhedral reflector 7' is driven by the motor 25 to rotate around the central axis C' at a prescribed velocity; while the rotary polyhedral reflector 7' is rotating, R, G and B light rays from the collimator lenses 6a, 6b are reflected first by the primary reflective surfaces and then by the secondary reflective surface and emitted to PBS 8. The R, G, and B light rays from PBS 8 are thrown on the reflection type display device 9. As the rotary polyhedral reflector 7' rotates and the reflection plane thereof changes from one reflective surface to a next one, the R, G, and B light rays thrown on the display device 9 scroll in a prescribed direction on the device 9. The optical system including the above various components from the lamp unit 1 to the projector 10 constitutes an optical unit in an image display apparatus where the optical system portion ranging from the first lens array 2 to PBS 8 serves as an illumination optical system for the display device 9.

FIG. 5 shows the exemplary structure of the rotary polyhedral reflector 7' shown in FIG. 4. This rotary polyhedral reflector 7' has a ring of eight reflective surfaces 7'a, 7'b, 7'c, 7'd, 7'e, 7'f, 7'g, 7'h around the central axis C' on its inner side, as primary reflective surfaces, and a secondary reflective surface 7'i on a plane perpendicular to the central axis C'. The eight primary reflective surfaces adjoin each other like a ring, forming an equilateral octagon. The angle formed by neighboring primary reflective surfaces (i.e. the angle formed by 7'a and 7'b, 7'b and 7'c, 7'c and 7'd, 7'd and 7'e, 7'e and 7'f, 7'f and 7'g, and 7'g and 7'h) is approximately 135 degrees. The secondary reflective surface 7'i is a single reflective surface. R, G, and B light rays reflected by the dichroic mirrors 5a, 5b, 5c are collimated by the collimator lenses 6a and 6b and reflected by the primary reflective surfaces on the inner side of the rotary polyhedral reflector 7' and the secondary reflective surface. FIG. 5 also shows how color light rays are reflected by the primary reflective surface 7'a and the secondary reflective surface 7'i. As the rotary polyhedral reflector 7' rotates, the reflection plane (surface which reflects incident light) sequentially changes with time (7'a-7'b-7'c-7'd-7'e-7'f-7'g-7'h) and light incident/reflection points and angles on each of the reflective surfaces change accordingly. Since the secondary reflective surface 7'i is a single surface perpendicular to the central axis C', there is no change in the reflection plane nor variation in incident/reflection angle during rotation of the reflector, though the incident/reflection point changes. As the reflection plane (primary reflective surfaces) changes and the incident/reflection point and angle on each reflective surface change, the direction of light emitted to PBS 8 changes with time. Regarding the eight primary reflective surfaces 7'a, 7'b, 7'c, 7'd, 7'e, 7'f, 7'g, 7'h, the angle formed by neighboring reflective surfaces is smaller than 180 degrees, so reflected light rays of different colors do not cross when R, G, and B light rays are reflected on the same reflective surface. Either or both of the eight primary reflective surfaces 7'a, 7'b, 7'c, 7'd, 7'e, 7'f, 7'g, 7'h and the secondary reflective surface 7'i may transmit ultraviolet rays and far-infrared rays. The above-mentioned arrangements improve purity of reflected light colors.

In the second embodiment as demonstrated by FIGS. 4 and 5, as in the first embodiment, light from a lamp (not shown) in the lamp unit 1 is reflected and condensed by the oval, parabolic or aspheric reflective surface of the reflector 1a and sent to the first lens array 2 where plural secondary lamp images appear; then the second lens array 3 forms the plural secondary lamp images which are divided into P polarized light and S polarized light by the PBS of the polarization converter 4, and either polarized light, for example, P polarized light, is rotated by the half-wave retardation plate to be converted into S polarized light and combined with the S polarized light resulting from the division by the PBS, and emitted from the polarization converter 4. The white S polarized light from the polarization converter 4 enters the cylindrical lens 11 where the beam is narrowed down in the direction in which the curvature is formed (horizontal direction in the case of FIG. 4). The white S polarized light from the cylindrical lens 11 reaches the dichroic mirrors 5a, 5b 5c for color separation. First, the red light reflection dichroic mirror 5a reflects the R component of the incident white S polarized light to separate it from the rest of the light; then the blue light reflection dichroic mirror 5b reflects the B component of the incident S polarized light to separate it from the G component; and lastly the green light reflection dichroic mirror 5c reflects the G component. The R, G, and B light rays as color-separated S polarized light are collimated by the collimator lenses 6a and 6b and sent to the rotary polyhedral reflector 7'.

In the rotary polyhedral reflector 7', while it is rotating, the R, G, and B light rays are sequentially reflected by the eight primary reflective surfaces 7'a, 7'b, 7'c, 7'd, 7'e, 7'f, 7'g, 7'h on its inner side, and by the secondary reflective surface 7'i, then sent to PBS 8, where the R, G, and B light rays as S polarized light are reflected by the analyzing film 8a and thrown on the reflection type display device 9. The reflection type display device 9, which is driven by the drive circuit according to an image signal, modulates the incoming R, G and B light rays according to the image signal and emits the S polarized light as reflected light of P polarized light again to PBS 8. The P polarized light coming from PBS 8 enters the projector 10. This embodiment assumes that R, G, and B light rays from PBS 8 are all P polarized light. The P polarized light which has entered the projector 10 is projected on a screen, etc. in enlarged form to project an image according to the above-said image signal.

According to this second embodiment, as in the first embodiment, the apparatus is mainly composed of a rotary polyhedral reflector 7' and one display device so that a simple, compact, low-cost optical unit or image display apparatus can be realized. Since reflected light rays of different colors do not cross when R, G, and B light rays are reflected on the same reflective surface in the rotary polyhedral reflector 7', light spots of different colors do not overlap on the display device 9, which eliminates wasted light. Therefore, the F number of the optical system need not be small and thus the screen brightness can be increased. In this sense, the optical unit or apparatus can also be compact. Especially, the rotary polyhedral reflector 7' uses its primary reflective surfaces and its secondary one to reflect light so that it can be more compact, and by altering the angle of the secondary reflective surface against the primary ones or a similar method, the direction of emission of R, G, and B light rays from the secondary one can be altered, which increases design latitude. Also, adjustment of R, G, and B light projection spots on the display device 9 is no longer needed.

Figure 6:
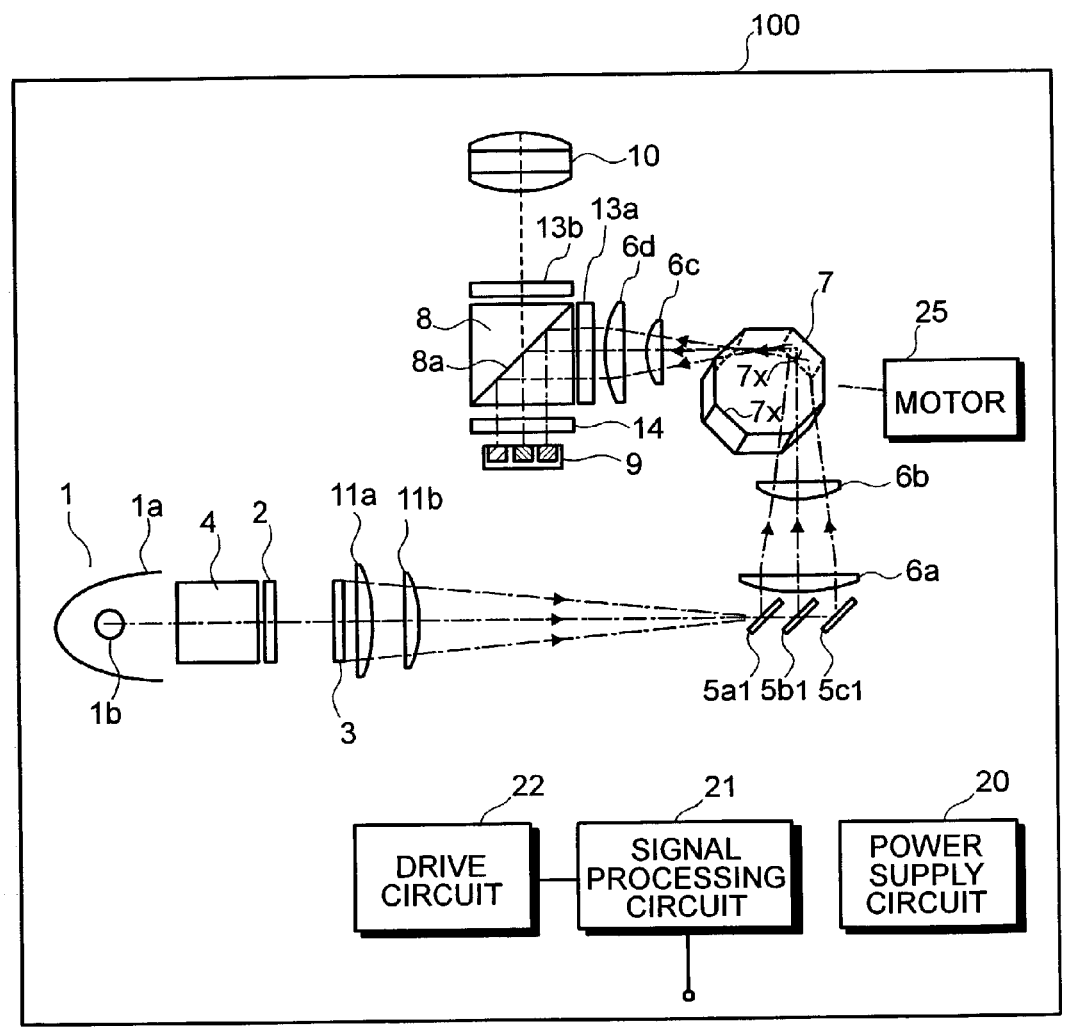
FIG. 6 is an exemplary diagram for illustrating third embodiment.

FIG. 6 shows the exemplary structure of a projection type image display apparatus as a third embodiment.

This embodiment uses three small dichroic mirrors for color separation which are parallel to each other.

In FIG. 6, numeral 1 represents a lamp and 1a represents a reflector with an oval, parabolic or aspheric reflective surface which reflects light from the lamp in a given direction; 1b represents a light source such as a lamp. A numeral 2 represents a first lens array which consists of plural micro condenser lenses and 3 represents a second lens array which consists of plural micro condenser lenses and makes an image of each lens of the first lens array. A numeral 4 designates a polarization converter which consists of a polarizing beam splitter (PBS) and a half-wave retardation plate and divides light from the lamp unit 1 into P polarized light and S polarized light, and rotates either polarized light to make it identical to the other polarized light. Symbols 5a1, 5b1, and 5c1 represent dichroic mirrors which color-separate the polarized light by reflection and transmission as referred to collectively as color separator. 5a1 is a red light reflection dichroic mirror which reflects red light and transmits blue and green light, 5b1 a blue light reflection dichrioic mirror which reflects blue light and transmits green light, and 5c1 a green light reflection dichroic mirror which reflects green light. The dichroic films of the dichroic mirrors 5a1, 5b1, and 5c1 are parallel to each other and arranged in a way that light reaches and exits them at approximately 45 degrees. Symbols 6a and 6b represent collimator lenses which collimate R, G, and B light rays coming from the dichroic mirrors 5a1, 5b1, 5c1. A numeral 7 represents a rotary polyhedral reflector which has the same structure as seen in the first embodiment (FIG. 1 and FIGS. 2A and 2B) or the second embodiment (FIGS. 4 and 5) and rotates around the central axis with plural reflective surfaces (a ring of reflective surfaces 7x) on its inner side to reflect R, G, and B light. Symbols 6c and 6d designate collimator lenses which collimate light rays from the rotary polyhedral reflector 7. A numeral 8 represents a polarizing beam splitter (PBS); 8a an analyzing film 8a built in PBS8, which reflects either of P polarized light and S polarized light and transmits the other. A numeral 9 denotes a reflection type display device (e.g. a reflection type liquid crystal panel) which modulates R, G, and B light rays according to an image signal to form an image. A numeral 10 represents a projector which projects light rays emitted from PBS 8 on a screen in enlarged form. Symbols 11a and 11b represent a collimator lens and a condenser lens, respectively, which focus light rays from the second lens array 3 onto the display device 9. Symbols 13a and 13b represent polarizing plates which transmit (S or P) polarized light. A numeral 14 denotes a quarter-wave retardation plate which converts reflected light at the light shield of the display device 9 into P polarized light to prevent stray light from being mixed with image light formed on the display device 9. A numeral 20 represents a power supply circuit; 21 represents a signal processing circuit which processes image signals coming from the outside; and 22 represents a drive circuit which drives the display device 9 according to signals from the signal processing circuit 21. A numeral 25 represents a motor which rotates the rotary polyhedral reflector 7. A numeral 100 represents an image display apparatus.

Like the first embodiment, driven by the motor, the rotary polyhedral reflector 7 rotates around the central axis at a prescribed velocity, and the plural reflective surfaces of the reflector 7 sequentially reflect R, G, and B light rays coming from the collimator lenses 6a and 6b while rotating around the central axis. The reflected R, G, and B light rays go through the collimator lenses 6c and 6d, polarizing plate 13a, PBS 8 and quarter-wave retardation plate 14 to be thrown on the display device 9. As the rotary polyhedral reflector 7 rotates and the reflection plane thereof sequentially changes from one reflective surface to a next one, the R, G, and B light rays thrown on the display device 9 scroll in a prescribed direction on the device 9. The optical system including the above various components from the lamp unit 1 to the projector 10 constitutes an optical unit in an image display apparatus where the optical system portion ranging from the polarization converter 4 to the quarter-wave retardation plate 14 serves as an illumination optical system for the reflection type display device 9.

In the third embodiment, light (white) from the lamp 1b in the lamp unit 1 is reflected and condensed by the reflector 1a and sent to the polarization converter 14. In the polarization converter 4, the white light is divided into P polarized light and S polarized light by the PBS (not shown). The P polarized light is rotated by the half-wave retardation plate (not shown) to be converted into S polarized light and combined with the S polarized light resulting from the division by the PBS and emitted from the polarization converter 4. Contrary to the above-mentioned case, the half-wave retardation plate in the polarization converter 4 may convert the S polarized light into P polarized light so that P polarized light is emitted from the polarization converter 4. The white S polarized light from the polarization converter 4 is sent to the first lens array 2 where plural secondary lamp images appear; then the plural secondary lamp images are formed by the second lens array 3 and the light of the formed images reaches the dichroic mirrors 5a1, 5b1, 5c1 for color separation through a collimator lens 11a and a condenser lens 11b. First, the red light reflection dichroic mirror 5a1 reflects the R (red) component of the incident white S polarized light to separate it from the rest of the light; then the blue light reflection dichroic mirror 5b1 reflects the B (blue) component of the incident S polarized light to separate it from the G (green) component; and lastly the green light reflection dichroic mirror 5c1 reflects the G (green) component. The R, G, and B light rays as color-separated S polarized light are collimated by the collimator lenses 6a and 6b and sent to a reflective surface of the rotary polyhedral reflector 7.

In the rotary polyhedral reflector 7, while it is rotating, the R, G, and B light rays are reflected by the reflective surfaces on its inner side. The reflected light rays pass through the collimator lenses 6c and 6d, and polarizing plate 13a and enters PBS 8, where the R, G, and B light rays as S polarized light are reflected by the analyzing film 8a and thrown on the reflection type display device 9 through the quarter-wave retardation plate 14. The reflection type display device 9, which is driven by the drive circuit according to an image signal, modulates the incoming R, G and B light rays according to the image signal to convert the S polarized light into P polarized light and emit it as reflected light. The emitted light passes through the quarter-wave retardation plate 14 and again enters PBS 8. In PBS 8, the amount of light emitted to the projection lens 10 and the amount of light emitted to the lamp side are determined according to the relation between the polarization state of incident P polarized light and PBS 8's polarization axis for transmission and reflection. The P polarized light emitted from PBS 8 as combined light enters the projector 10 through polarizing plate 13b. The P polarized light which has entered the projector 10 is projected on a screen, etc. in enlarged form to project an image according to the above-said image signal.

According to this third embodiment, as in the first embodiment, the apparatus is mainly composed of a rotary polyhedral reflector 7 and one display device 9 so that a simple, compact, low-cost optical unit or image display apparatus can be realized. Since reflected R, G, and B light rays do not cross when R, G, and B light rays are reflected on the same reflective surface in the rotary polyhedral reflector 7, R, G, and B light spots do not overlap on the display device 9, which eliminates wasted light. Therefore, the F number of the optical system need not be small and thus the screen brightness can be increased. In this sense, the optical unit or apparatus can also be compact. In addition, the constitution where the dichroic mirrors 5a1, 5b1, 5c1 as a color separator are small and use dichroic films which are parallel to each other, and light hits and exits them at approximately 45 degrees eliminates wasted light and allows the efficiency of color separation to increase with resultant improvement in contrast and color purity. Furthermore, because the dichroic films are to be parallel to each other, it is easier to design the optical system. Also, adjustment of R, G, and B light projection spots on the display device 9 is no longer needed.

Figure 7:
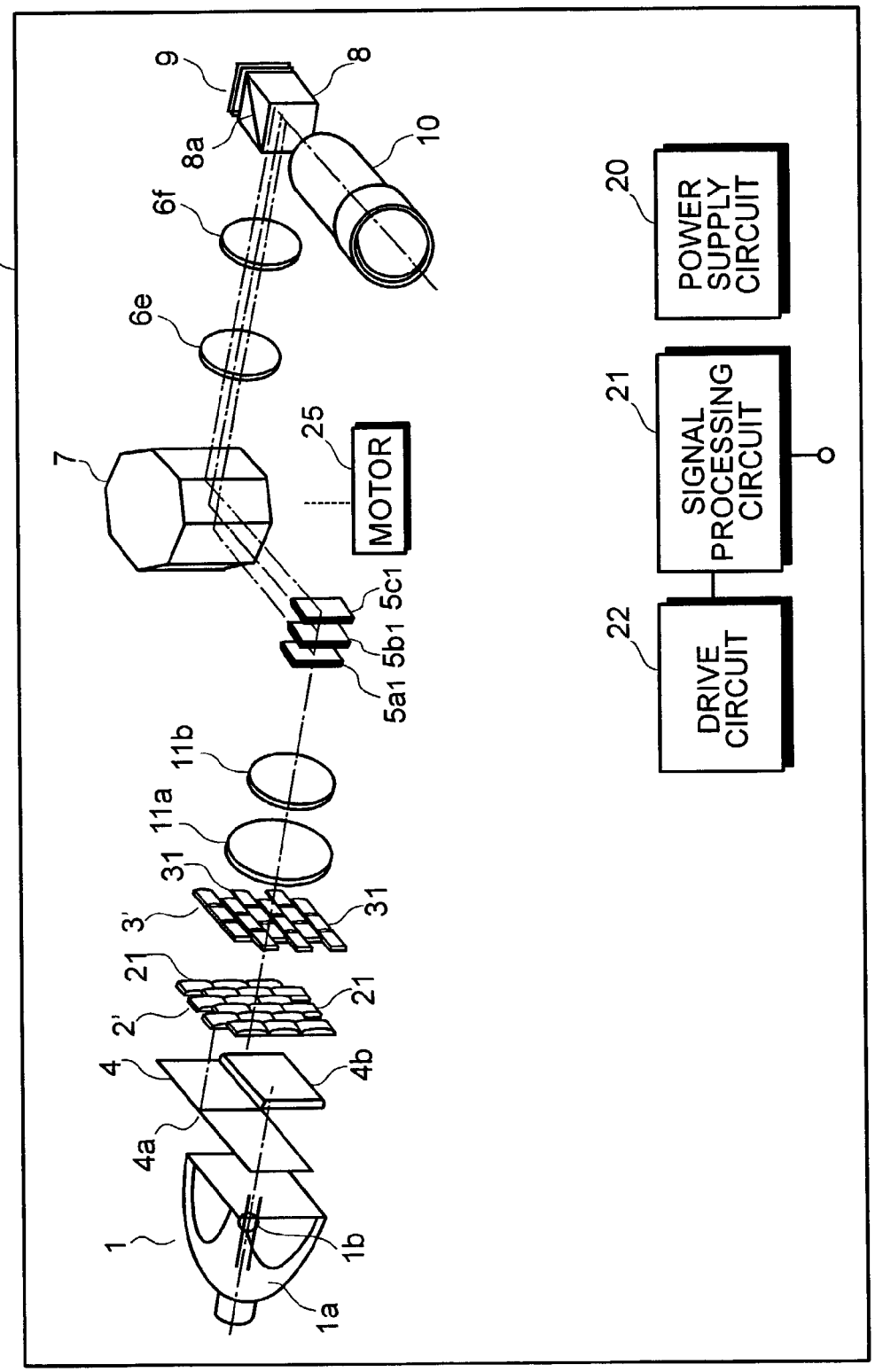
FIG. 7 is an exemplary diagram for illustrating fourth embodiment.
Figure 8A:
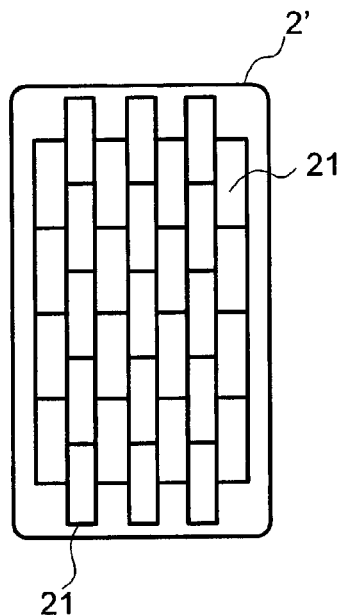
FIGS. 8A to 8C concern the fourth embodiment.
Figure 8B:
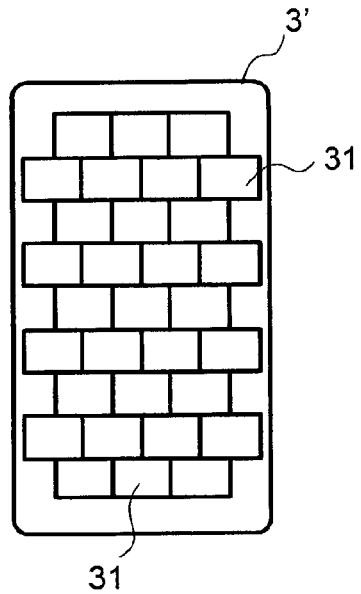
Figure 8C:
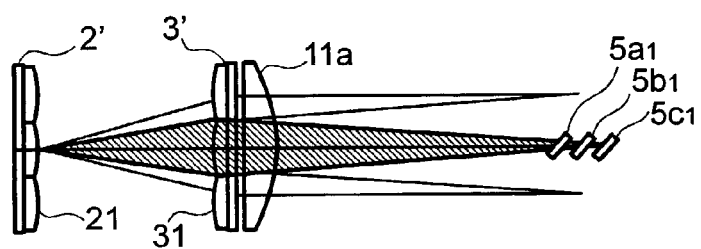
Figure 8D:
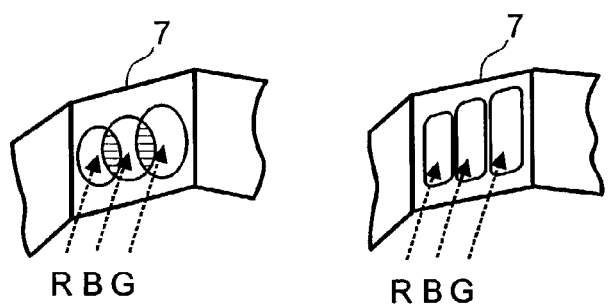
FIG. 8D illustrates lens images as reflected on a reflective surface of the rotary polyhedral reflector.

FIG. 7 and FIGS. 8A to 8D are explanatory drawings for a fourth embodiment. FIG. 7 shows the exemplary structure of a projection type image display apparatus as the fourth embodiment; FIG. 8A and FIG. 8B illustrate lens arrays in the fourth embodiment; FIG. 8C explains how the lens arrays work; and FIG. 8D illustrates lens images as reflected on a reflective surface of the rotary polyhedral reflector 7.

In this embodiment, each lens array consists of plural condenser lenses which are arranged in a staggered pattern horizontally and vertically and, as in the third embodiment, small dichroic mirrors for color separation are parallel to each other.

In FIG. 7, numeral 1 represents a lamp unit; 1a a reflector; and 1b a light source or lamp. A symbol 2' represents a first lens array with a rectangular overall shape (longer side vertical) which consists of plural rectangular micro condenser lenses 21 arranged in a staggered pattern (longer sides vertical) both horizontally and vertically; and 3' a second lens array with a rectangular overall shape (longer side vertical) which consists of plural micro condenser lenses 31 arranged in a staggered pattern both horizontally and vertically and forms an image of each lens of the first lens array. A numeral 4 represents a polarization converter which consists of a PBS and a half-wave retardation plate and divides light from the lamp unit 1 into P polarized light and S polarized light, and rotates either polarized light to make it identical to the other polarized light; and 5a1, 5b1, and 5c1 represent dichroic mirrors which color-separate the polarized light by reflection and transmission, where 5a1 is a red light reflection dichroic mirror which reflects red light and transmits blue and green light, 5b1 a blue light reflection dichrioic mirror which reflects blue light and transmits green light, and 5c1 a green light reflection dichroic mirror which reflects green light. The dichroic films of the dichroic mirrors 5a1, 5b1, and 5c1 are parallel to each other and arranged in a way that light hits and exits them at approximately 45 degrees. A numeral 7 represents a rotary polyhedral reflector which has the same structure as seen in the first embodiment or the second embodiment (FIGS. 4 and 5) and rotates around the central axis with plural reflective surfaces on its inner side to reflect R, G, and B light. Symbols 6e and 6f denote collimator lenses which collimate light rays from the rotary polyhedral reflector 7. A numeral 8 represents a polarizing beam splitter (PBS), and 8a represents an analyzing film built in PBS 8, which reflects either of P polarized light and S polarized light and transmits the other. A numeral 9 designates a reflection type display device (e.g. a reflection type liquid crystal panel) which modulates R, G, and B light rays according to an image signal to form an image. A numeral 10 represents a projector which projects light rays emitted from PBS 8 on a screen in enlarged form. Symbols 11a and 11b represent a collimator lens and a condenser lens, respectively, which focus light rays from the second lens array 3' onto the display device 9. A numeral 20 designates a power supply circuit; 21 represents a signal processing circuit which processes image signals coming from the outside; and 22 represents a drive circuit which drives the display device 9 according to signals from the signal processing circuit 21. A numeral 25 represents a motor which rotates the rotary polyhedral reflector 7. A numeral 100 represents an image display apparatus.

Like the first embodiment, driven by the motor 25, the rotary polyhedral reflector 7 rotates around the central axis at a prescribed velocity; and the plural reflective surfaces of the reflector 7 sequentially reflect R, G, and B light rays coming from the dichroic mirrors 5a1, 5b1, 5c1 while rotating around the central axis. The reflected R, G, and B light rays go through the collimator lenses 6e and 6f, and PBS 8 to be thrown on the reflection type display device 9. As the rotary polyhedral reflector 7 rotates and the reflection plane thereof sequentially changes from one reflective surface to a next one, the R, G, and B light rays thrown on the display device 9 scroll in a prescribed direction on the device 9. The optical system including the above various components from the lamp unit 1 to the projector 10 constitutes an optical unit in an image display apparatus where the optical system portion ranging from the polarization converter 4 to PBS 8 serves as an illumination optical system for the reflection type display device 9.

FIG. 8A and FIG. 8B respectively illustrate the first lens array 2' and the second lens array 3' as shown in FIG. 7; FIG. 8C explains how the first lens array 2' and the second lens array 3' work; and FIG. 8D illustrates lens images of the second lens array 3' as reflected on a reflective surface of the rotary polyhedral reflector 7. In this embodiment, the first lens array 2' has plural rectangular condenser lenses which are arranged horizontally in a staggered pattern with their longer sides vertical in a way that the overall lens array is a rectangle with its longer sides vertical (FIG. 8A); and the second lens array 3' has plural rectangular condenser lenses which are arranged vertically in a staggered pattern with their longer sides horizontal in a way that the overall lens array is a rectangle with its longer sides vertical (FIG. 8B) like the first lens array. Here, plural secondary lamp images appear on the first lens array 2'; then the second lens array 3' forms the plural secondary lamp images on the dichroic mirrors 5a1, 5b1, 5c1 and in the vicinity of the reflective surfaces of the rotary polyhedral reflector 7 (FIG. 8C). Because the condenser lenses in the lens array 2' or 3' are arranged in a staggered pattern horizontally or vertically with their longer sides vertical or horizontal as mentioned above, the open area ratio of the lens arrays increases and R, G, and B light spots which have the same rectangular shape as the first lens array 2' appear on a reflective surface of the rotary polyhedral reflector 7 with no color overlaps (FIG. 8D). The increased open area ratio of the lens arrays improves the brightness of images, and the elimination of color spot overlaps enhances image contrast. In FIG. 8D, the illustration on the left shows how R, G, and B light spots overlap on a reflective surface of the rotary polyhedral reflector 7 when a conventional lens array is used.

In the fourth embodiment, light (white) from the lamp 1b in the lamp unit 1 is reflected and condensed by the reflector 1a and sent to the polarization converter 4. In the polarization converter 4, the white light is divided into P polarized light and S polarized light by the PBS (not shown). The P polarized light is rotated by the half-wave retardation plate (not shown) to be converted into S polarized light and combined with the S polarized light resulting from the division of light by the PBS and emitted from the polarization converter 4. The white S polarized light from the polarization converter 4 is sent to the first lens array 2' where plural secondary lamp images appear; then the plural secondary lamp images are formed by the second lens array 3' and the light of the formed images reaches, through the collimator lens 11a and condenser lens 11b, the dichroic mirrors 5a1, 5b1, 5c1 for color separation. First, the red light reflection dichroic mirror 5a1 reflects the R (red) component of the incident white S polarized light to separate it from the rest of the light; then the blue light reflection dichroic mirror 5b1 reflects the B (blue) component of the incident S polarized light to separate it from the G (green) component; and lastly the green light reflection dichroic mirror 5c1 reflects the G (green) component. The R, G, and B light rays as color-separated S polarized light are sent to a reflective surface on the inner side of the rotary polyhedral reflector 7. In the rotary polyhedral reflector 7, while it is rotating, the R, G, and B light rays are sequentially reflected by the reflective surfaces on its inner side. The reflected light rays pass through the collimator lenses 6e and 6f, and enters PBS 8, where the R, G, and B light rays as S polarized light are reflected by the analyzing film 8a and thrown on the reflection type display device 9. The reflection type display device 9, which is driven by the drive circuit according to an image signal, modulates the incoming R, G and B light rays according to the image signal to convert the S polarized light into P polarized light and emits it as reflected light. The emitted light passes through the quarter-wave retardation plate 14 and again enters PBS 8. In PBS 8, the amount of light emitted to the projection lens 10 and the amount of light emitted to the lamp side are determined according to the relation between the polarization state of incident P polarized light and PBS 8's polarization axis for transmission and reflection. The P polarized light emitted from PBS 8 as combined light enters the projector 10. The P polarized light which has entered the projector 10 is projected on a screen, etc. in enlarged form to project an image according to the above-said image signal.

According to this fourth embodiment, as in the first embodiment, the apparatus is mainly composed of a rotary polyhedral reflector 7 and one display device 9 so that a simple, compact, low-cost optical unit or image display apparatus can be realized. Since reflected R, G and B light rays do not cross when R, G, and B light rays are reflected on the same reflective surface in the rotary polyhedral reflector 7, R, G, and B light spots do not overlap on the display device 9, which eliminates wasted light. Therefore, the F number of the optical system need not be small and thus the screen brightness can be increased. In this sense, the optical unit or apparatus can be compact. In addition, as in the third embodiment, the dichroic mirrors 5a1, 5b1, 5c1 for color separation are small and use dichroic films which are parallel to each other and receive and emit light at approximately 45 degrees so that wasted light can be eliminated and the efficiency of color separation can be increased with resultant improvement in contrast and color purity. Furthermore, because the dichroic films are to be parallel to each other, it is easier to design the optical system. In the fourth embodiment, the lens open area ratio is increased, thereby improving the screen brightness. Also, adjustment of R, G, and B light projection spots on the display device 9 is no longer needed. The first lens array 2' features plural condenser lenses arranged in a staggered pattern horizontally (FIG. 8A) and the second lens array 3' features plural condenser lenses arranged in a staggered pattern vertically (FIG. 8B). However the invention is not limited thereto. For example, the first lens array 2' may have plural condenser lenses arranged in a staggered pattern vertically or both horizontally and vertically, or the second lens array 3' may have plural condenser lenses arranged in a staggered pattern horizontally or both horizontally and vertically.

Figure 9:
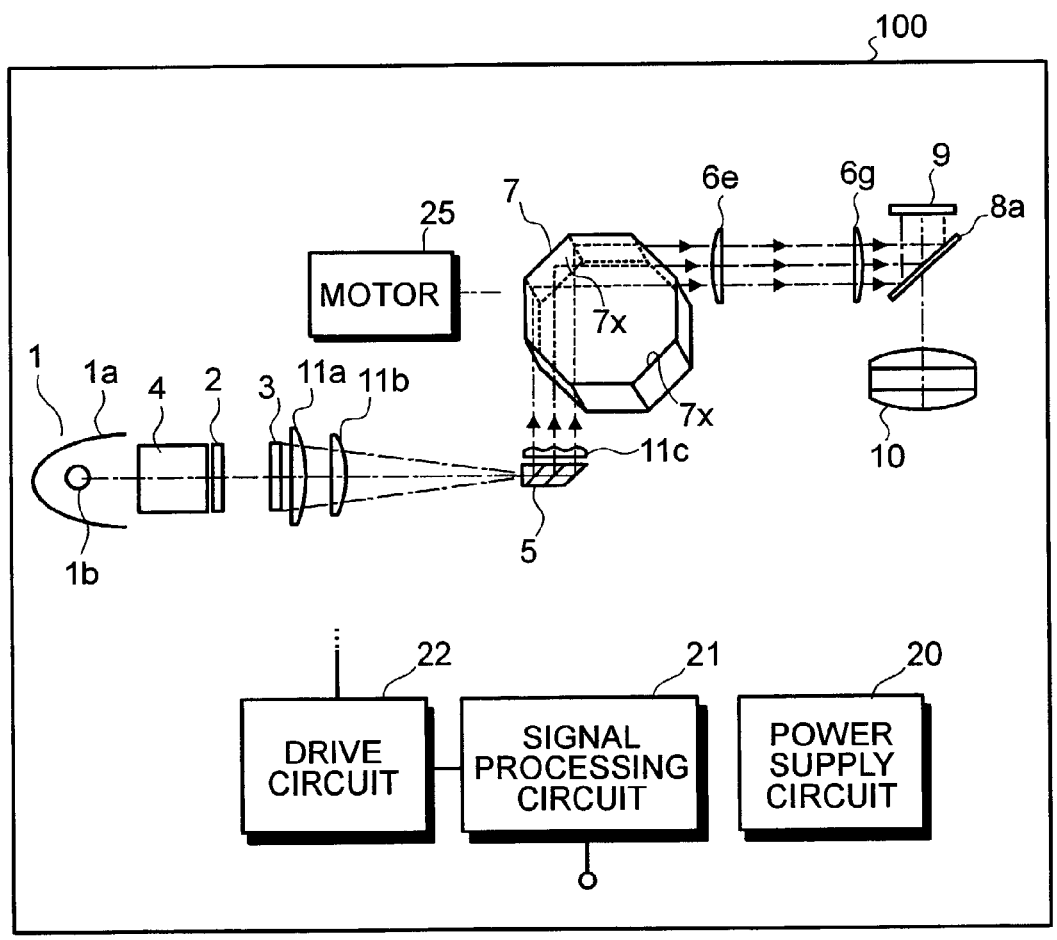
FIG. 9 is an exemplary diagram for fifth embodiment.

FIG. 9 shows the exemplary structure of a projection type image display apparatus as a fifth embodiment.

This embodiment uses prism dichroic mirrors as color separator.

In FIG. 9, numeral 1 represents a lamp unit; 1a represents a reflector; 1b represents a light source or lamp. A numeral 2 represents a first lens array, and 3 represents a second lens array which makes an image of each lens of the first lens array 2. A numeral 4 designates a polarization converter which consists of a polarizing beam splitter (PBS) and a half-wave retardation plate and 5 a dichroic mirror for color separation as a prism made of glass or similar material. The dichroic mirror 5 consists of three dichroic films with glass sandwiched. The three dichroic films are parallel to each other and light hits and exits each of these films at approximately 45 degrees. A symbol 11c shows a collimator lens which collimates R, G, and B light rays from the dichroic mirror 5. A numeral 7 represents a rotary polyhedral reflector which has the same structure as seen in the first embodiment (FIG. 1 and FIGS. 2A and 2B) or the second embodiment (FIGS. 4 and 5) and rotates around the central axis with plural reflective surfaces (a ring of reflective surfaces 7x) on its inner side to reflect R, G, and B light. Symbols 6e and 6g represent collimator lenses which collimate light rays from the rotary polyhedral reflector 7. A symbol 8a represents an analyzing film built in a PBS, which reflects either of P polarized light and S polarized light and transmits the other. A numeral 9 denotes a reflection type display device which modulates R, G, and B light rays according to an image signal to form an image. A numeral 10 designates a projector. Symbols 11a and 11b represent a collimator lens and a condenser lens, respectively, which focus light rays from the second lens array 3 onto the display device 9. A numeral 20 represents a power supply circuit; 21 a signal processing circuit which processes image signals coming from the outside; and 22 a drive circuit which drives the display device 9 according to signals from the signal processing circuit 21. A numeral 25 represents a motor which rotates the rotary polyhedral reflector 7. A numeral 100 represents an image display apparatus.

Like the first embodiment, driven by the motor 25, the rotary polyhedral reflector 7 rotates around the central axis at a prescribed velocity, and the plural reflective surfaces of the reflector 7 sequentially reflect R, G, and B light rays coming from the collimator lens 11c while rotating around the central axis. The reflected R, G, and B light rays go through the collimator lenses 6e and 6g and the analyzing film 8a of the PBS 8 and reach the display device 9. As the rotary polyhedral reflector 7 rotates and the reflection plane thereof sequentially changes from one reflective surface to a next one, the R, G, and B light rays thrown on the display device 9 scroll in a prescribed direction on the device 9. The optical system including the above various components from the lamp unit 1 to the projector 10 constitutes an optical unit in an image display apparatus where the optical system portion ranging from the polarization converter 4 to the PBS serves as an illumination optical system for the reflection type display device 9.

In the fifth embodiment, light (white) from the lamp 1b in the lamp unit 1 is reflected and condensed by the reflector 1a and sent to the polarization converter 4. In the polarization converter 4, the white light is divided into P polarized light and S polarized light by the PBS (not shown). The P polarized light is rotated by the half-wave retardation plate (not shown) to be converted into S polarized light and combined with the S polarized light resulting from the division of light by the PBS and emitted from the polarization converter 4. Contrary to the above-mentioned case, the half-wave retardation plate may convert the S polarized light into P polarized light so that P polarized light is emitted from the polarization converter 4. The white S polarized light from the polarization converter 4 is sent to the first lens array 2 where plural secondary lamp images appear; then the plural secondary lamp images are formed by the second lens array 3 and the light of the formed images reaches the prism dichroic mirror 5 for color separation through the collimator lens 11a and condenser lens 11b. In the dichroic mirror 5, first, the red light reflection dichroic film reflects the R (red) component of the incident white S polarized light to separate it from the rest of the light; then the blue light reflection dichroic film reflects the B (blue) component of the incident S polarized light to separate it from the G (green) component; and lastly the green light reflection dichroic film reflects the G (green) component. The R, G, and B light rays as color-separated S polarized light are collimated by the collimator lens 11c and sent to a reflective surface on the inner side of the rotary polyhedral reflector 7. In the rotary polyhedral reflector 7, while it is rotating, the R, G, and B light rays are reflected sequentially by the reflective surfaces on its inner side. The reflected light rays pass through the collimator lenses 6e and 6g, and reaches the analyzing film 8a of the PBS, where the R, G, and B light rays as S polarized light are reflected by the analyzing film 8a and thrown on the reflection type display device 9. The reflection type display device 9, which is driven by the drive circuit according to an image signal, modulates the incoming R, G and B light rays according to the image signal to convert the S polarized light into P polarized light and emits it as reflected light. The emitted light goes back to the analyzing film 8a of the PBS. On the analyzing film 8a, the amount of light emitted to the projection lens 10 and the amount of light emitted to the lamp side are determined according to the relation between the polarization state of incident P polarized light and the PBS analyzing film 8a's polarization axis for transmission and reflection. The P polarized light emitted from the PBS analyzing film 8a as combined light enters the projector 10, which projects it on a screen, etc. in enlarged form to project an image according to the above-said image signal.

According to this fifth embodiment, as in the first embodiment, the apparatus is mainly composed of a rotary polyhedral reflector 7 and one display device 9 so that a simple, compact, low-cost optical unit or image display apparatus can be realized. Since reflected R, G, and B light rays do not cross when R, G, and B light rays are reflected on the same reflective surface in the rotary polyhedral reflector 7, R, G, and B light spots do not overlap on the display device 9, which eliminates wasted light.

Therefore, the F number of the optical system need not be small and thus the screen brightness can be increased. In this sense, the optical unit or apparatus can be more compact. In addition, since the dichroic mirror has glass or similar material between dichroic films, even if the distance between dichroic films is set to be long enough to prevent mixture of reflected light colors, the distance can be optically shortened. Therefore, R, G, and B light spots on the reflective surfaces of the rotary polyhedral reflector can be small enough to ensure uniformity in reflected light conditions among R, G, and B light rays. Further, the dichroic films of the dichroic mirror 5 are small and parallel to each other and receive and emit light at approximately 45 degrees so that wasted light can be eliminated and the efficiency of color separation can be increased with resultant improvement in contrast and color purity. Also, it is easy to manufacture the dichroic mirror. Also, adjustment of R, G, and B light projection spots on the display device 9 is no longer needed.

Figure 10:
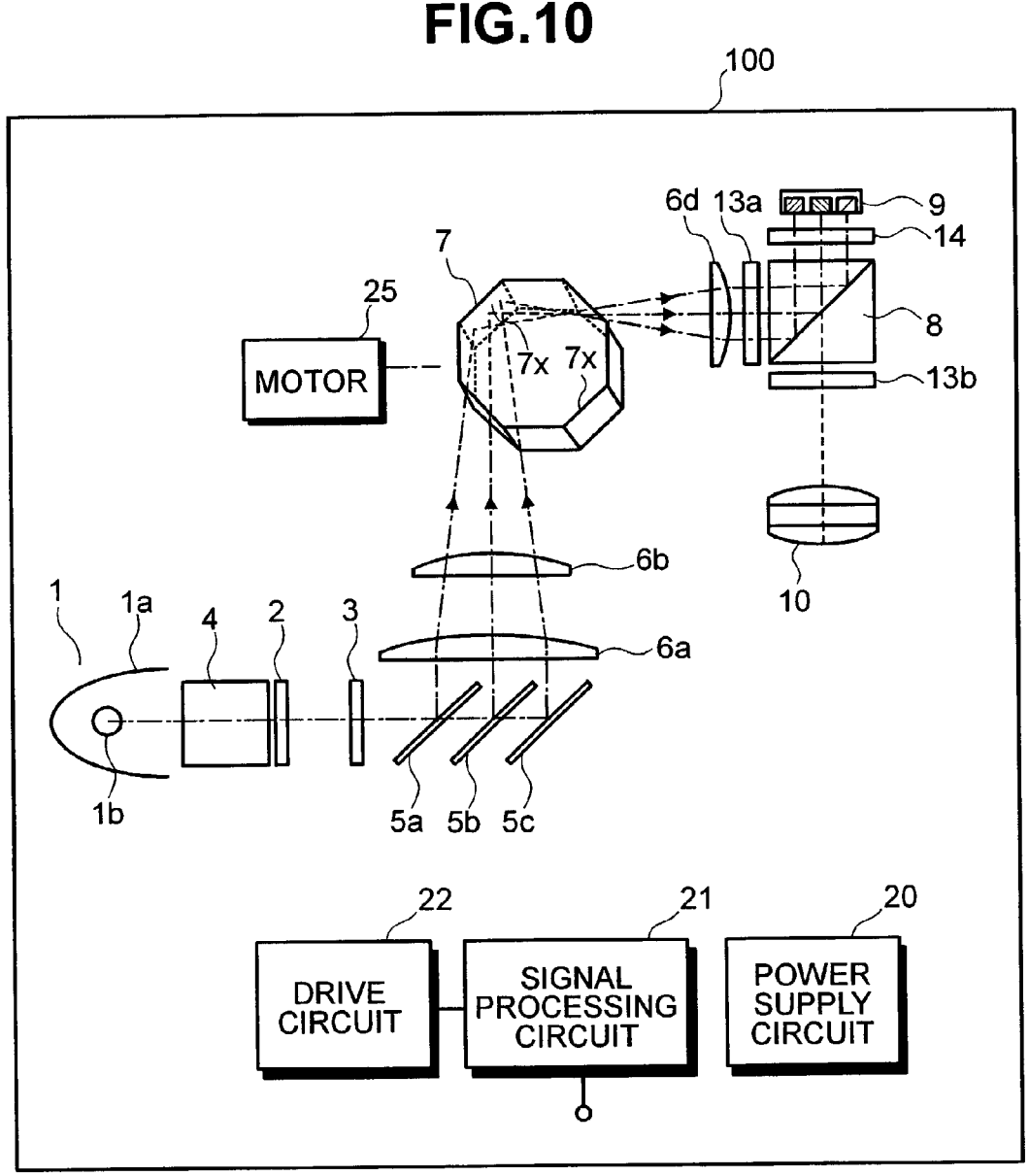
FIG. 10 is an exemplary diagram for illustrating sixth embodiment.

FIG. 10 shows the exemplary structure of a projection type image display apparatus as a sixth embodiment.

In this embodiment, light emitted from a second lens array is led to dichroic mirrors as color separator without being passed through collimator or condenser lenses to shorten the optical path in the optical unit.

In FIG. 10, numeral 1 represents a lamp unit; 1a denotes a reflector which reflects light from a lamp in a given direction; and 1b is a lamp. A numeral 2 represents a first lens array and 3 represents a second lens array which makes an image of each lens of the first lens array 2. A numeral 4 designates a polarization converter which divides light from the lamp unit 1 into P polarized light and S polarized light, and rotates either polarized light to make it identical to the other polarized light. Symbols 5a, 5b, and 5c represent dichroic mirrors which color-separate the polarized light by reflection and transmission. The dichroic mirrors 5a, 5b, 5c are arranged so that their dichroic films are parallel to each other and light rays hit and exit each of these films at approximately 45 degrees. Symbols 6a and 6b show collimator lenses which collimate R, G, and B light rays from the dichroic mirrors 5a, 5b, 5c. A numeral 7 represents a rotary polyhedral reflector which has the same structure as seen in the first embodiment (FIG. 1 and FIGS. 2A and 2B) or the second embodiment (FIGS. 4 and 5) and rotates around the central axis with plural reflective surfaces (a ring of reflective surfaces 7x) on its inner side to reflect R, G, and B light. A symbol 6d represents a collimator lens which collimates light rays from the rotary polyhedral reflector 7. A numeral 8 represents a polarizing beam splitter (PBS), and 8a represents an analyzing film built in PBS 8, which reflects either of P polarized light and S polarized light and transmits the other. A numeral 9 represents a reflection type display device (e.g. a reflection type liquid crystal panel) which modulates R, G, and B light rays according to an image signal to form an image. A numeral 10 designates a projector which projects light from PBS 8 on a screen in enlarged form. Symbols 13a and 13b represent polarizing plates which transmit (S or P) polarized light. A numeral 14 denotes a quarter-wave retardation plate which converts reflected light at the light shield of the display device 9 into P polarized light to prevent stray light from being mixed with image light formed on the display device 9. A numeral 20 represents a power supply circuit; 21 represents a signal processing circuit which processes image signals coming from the outside; and 22 represents a drive circuit which drives the display device 9 according to signals from the signal processing circuit 21. A numeral 25 represents a motor which rotates the rotary polyhedral reflector 7. A numeral 100 represents an image display apparatus.

Like the above-said other embodiments, driven by the motor 25, the rotary polyhedral reflector 7 rotates around the central axis at a prescribed velocity, and the plural reflective surfaces of the reflector 7 sequentially reflect R, G, and B light rays coming from the collimator lenses 6a and 6b while rotating around the central axis. The reflected R, G, and B light rays go through the collimator lens 6d, polarizing plate 13a, PBS 8 and quarter-wave retardation plate 14 and reaches the reflection type display device 9. As the rotary polyhedral reflector 7 rotates and the reflection plane thereof sequentially changes from one reflective surface to a next one, the R, G, and B light rays thrown on the display device 9 scroll in a prescribed direction on the device 9. The optical system including the above various components from the lamp unit 1 to the projector 10 constitutes an optical unit in an image display apparatus where the optical system portion ranging from the polarization converter 4 to the quarter-wave retardation plate 14 serves as an illumination optical system for the reflection type display device 9.

In the sixth embodiment, light (white) from the lamp 1b in the lamp unit 1 is reflected and condensed by the reflector 1a and sent to the polarization converter 14. In the polarization converter 4, the white light is divided into P polarized light and S polarized light by the PBS (not shown). The P polarized light is rotated by the half-wave retardation plate (not shown) to be converted into S polarized light and combined with the S polarized light resulting from the division of light by the PBS and emitted from the polarization converter 4. Contrary to the above-mentioned case, the half-wave retardation plate may convert the S polarized light into P polarized light so that P polarized light is emitted from the polarization converter 4. The white S polarized light from the polarization converter 4 is sent to the first lens array 2 where plural secondary lamp images appear; then the plural secondary lamp images are formed by the second lens array 3 and the light of the formed images reaches the dichroic mirrors 5a, 5b, 5c for color separation. First, the red light reflection dichroic mirror 5a reflects the R (red) component of the incident white S polarized light to separate it from the rest of the light; then the blue light reflection dichroic mirror 5b reflects the B (blue) component of the incident S polarized light to separate it from the G (green) component; and lastly the green light reflection dichroic mirror 5c reflects the G (green) component. The R, G, and B light rays as color-separated S polarized light are collimated by the collimator lenses 6a and 6b and sent to a reflective surface of the rotary polyhedral reflector 7. In the rotary polyhedral reflector 7, while it is rotating, the R, G, and B light rays are reflected by the eight reflective surfaces made on its inner side. The reflected light rays pass through the collimator lens 6d and polarizing plate 13a and enters PBS 8, where the R, G, and B light rays as S polarized light are reflected by the analyzing film 8a and thrown on the reflection type display device 9 through the quarter-wave retardation plate 14. The reflection type display device 9, which is driven by the drive circuit according to an image signal, modulates the incoming R, G and B light rays according to the image signal to convert the S polarized light into P polarized light and emit it as reflected light. The emitted light passes through the quarter-wave retardation plate 14 and again enters PBS 8. In PBS 8, the amount of light emitted to the projection lens 10 and the amount of light emitted to the lamp side are determined according to the relation between the polarization state of incident P polarized light and PBS 8's polarization axis for transmission and reflection. The P polarized light emitted from PBS 8 as combined light enters the projector 10 through the polarizing plate 13b. The P polarized light which has entered the projector 10 is projected on a screen, etc. in enlarged form to project an image according to the above-said image signal.

According to this sixth embodiment, as in the above-said other embodiments, the apparatus is mainly composed of a rotary polyhedral reflector 7 and one display device 9 so that a simple, compact, low-cost optical unit or image display apparatus can be realized. Since reflected R, G, and B light rays do not cross when R, G, and B light rays are reflected on the same reflective surface in the rotary polyhedral reflector 7, R, G, and B light spots do not overlap on the display device 9, which eliminates wasted light. Therefore, the F number of the optical system need not be small and thus the screen brightness can be increased. In this sense, the optical unit or apparatus can be compact. In addition, the dichroic mirrors 5a, 5b, 5c for color separation have dichroic films which are parallel to each other and receive and emit light at approximately 45 degrees so that the efficiency of color separation can be increased with resultant improvement in contrast and color purity. Furthermore, it is easier to design the optical system. Since there is no collimator lens nor condenser lens between the second lens array 3 and the dichroic mirror 5a and the optical path is shorter, it is possible to realize a more compact optical unit or apparatus and decrease light loss and increase the screen brightness. Also, adjustment of R, G, and B light projection spots on the display device 9 is no longer needed.

Figure 11:
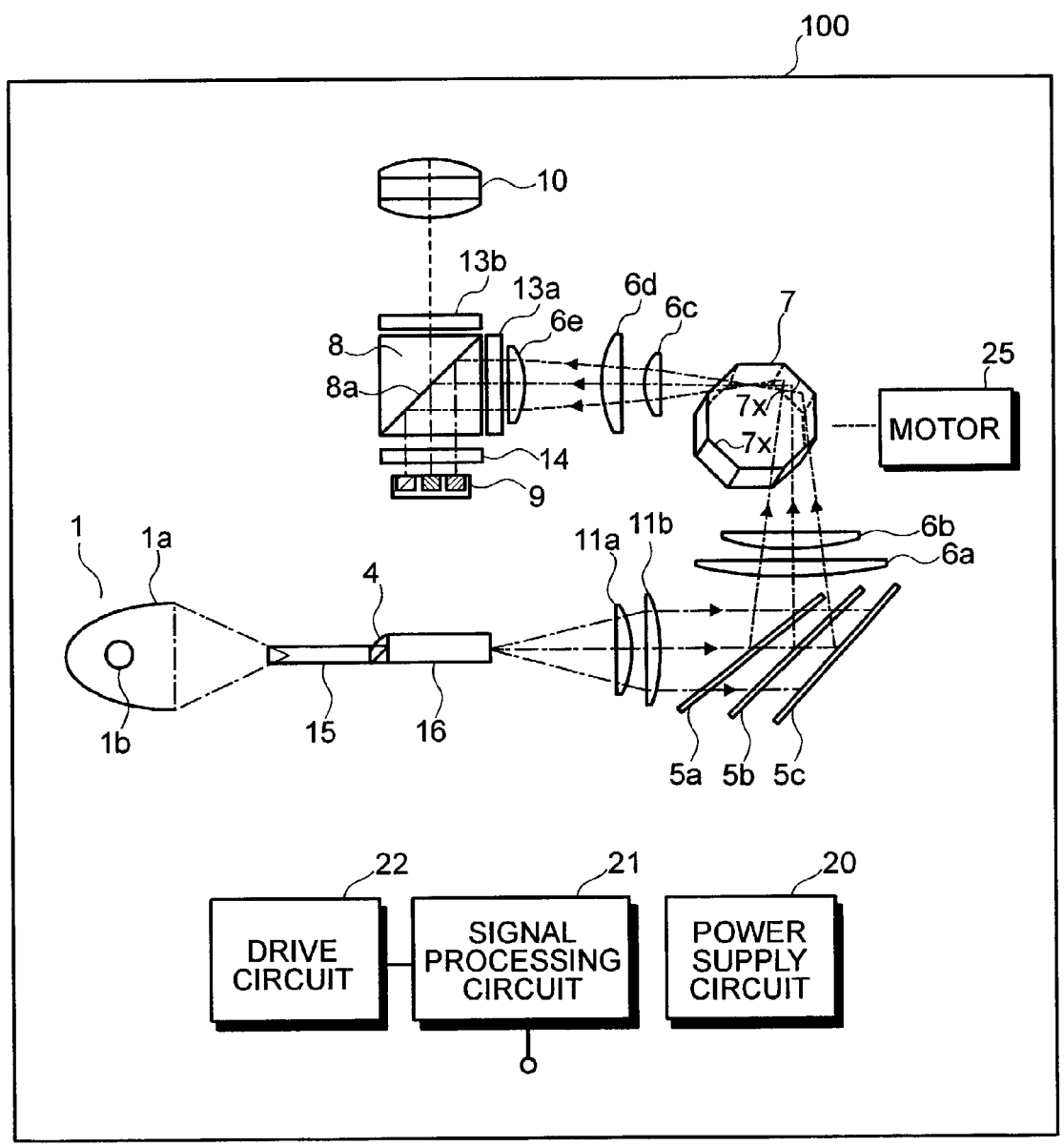
FIG. 11 is an exemplary diagram for illustrating seventh embodiment.

FIG. 11 shows the exemplary structure of a projection type image display apparatus as a seventh embodiment.

In this embodiment, the illumination optical system has an integrated light pipe before and after a polarization converter instead of lens arrays.

In FIG. 11, numeral 1 represents a lamp unit and 1a denotes a reflector with an oval reflective surface which reflects light from the lamp in a light converging direction; and 1a represents a light source such as a lamp. A numeral 15 designates a first light pipe through which incoming light advances while being reflected. A numeral 4 represents a polarization converter. A numeral 16 designates a second light pipe having a cross sectional area almost twice larger than that of the first light pipe 15, through which incoming light advances while being reflected. Although shown as straight pipes, those skilled in the art will recognized that the pipes may be curved or implemented by the flexible optical fibers. Symbols 5a, 5b, and 5c represent dichroic mirrors which color-separate the polarized light by reflection and transmission, where 5a signifies a red light reflection dichroic mirror which reflects red light and transmits blue and green light, 5b denotes a blue light reflection dichrioic mirror which reflects blue light and transmits green light, and 5c represents a green light reflection dichroic mirror which reflects green light. The dichroic films of the dichroic mirrors 5a, 5b1, and 5c are not parallel to each other and arranged in a way that light hits and exits each of the films at approximately 45 degrees. Symbols 6a and 6b represent collimator lenses which collimate R, G, and B light rays coming from the dichroic mirrors 5a, 5b, 5c. A numeral 7 represents a rotary polyhedral reflector which has the same structure as seen in the first embodiment (FIG. 1 and FIGS. 2A and 2B) or the second embodiment (FIGS. 4 and 5) and rotates around the central axis with plural reflective surfaces (a ring of reflective surfaces 7x) on its inner side to reflect R, G, and B light. Symbols 6c, 6d, and 6e represent collimator lenses which collimate light rays from the rotary polyhedral reflector 7. A numeral 8 represents a polarizing beam splitter (PBS) and 8a an analyzing film built in PBS 8, which reflects either of P polarized light and S polarized light and transmits the other. A numeral 9 represents a reflection type display device which modulates incoming R, G, and B light rays according to an image signal to form an image. A numeral 10 represents a projector which projects light rays emitted from PBS 8 on a screen in enlarged form. Symbols 13a and 13b represent polarizing plates which transmit (S or P) polarized light. Symbols 11a and 11b represent a collimator lens and a condenser lens, respectively, which focus light rays from the second light pipe 16 onto the display device 9. A numeral 14 denotes a quarter-wave retardation plate which converts reflected light at the light shield of the display device 9 into P polarized light to prevent stray light from being mixed with image light formed on the display device 9. A numeral 20 represents a power supply circuit; 21 signifies a signal processing circuit which processes image signals coming from the outside; and 22 denotes a drive circuit which drives the display device 9 according to signals from the signal processing circuit 21. A numeral 25 represents a motor which rotates the rotary polyhedral reflector 7. A numeral 100 represents an image display apparatus.

Like the first embodiment, driven by the motor, the rotary polyhedral reflector 7 rotates around the central axis at a prescribed velocity, and the plural reflective surfaces of the reflector 7 reflect R, G, and B light rays coming from the collimator lenses 6a and 6b while rotating around the central axis. The reflected R, G, and B light rays go through the collimator lenses 6c and 6d, polarizing plate 13a, PBS 8 and quarter-wave retardation plate 14 and reach the reflection type display device 9. As the rotary polyhedral reflector 7 rotates and the reflection plane thereof sequentially changes from one reflective surface to a next one, the R, G, and B light rays thrown on the display device 9 scroll in a prescribed direction on the device 9. The optical system including the above various components from the lamp unit 1 to the projector 10 constitutes an optical unit in an image display apparatus where the optical system portion ranging from the first light pipe 15 to the quarter-wave retardation plate 14 serves as an illumination optical system for the reflection type display device 9.

In the seventh embodiment, light (white) from the lamp 1b in the lamp unit 1 is reflected and condensed by the reflector 1a and sent to the first light pipe 15. The light advances through the first light pipe 15 while being reflected and reaches the polarization converter 4. In the polarization converter 4, the white light is divided into P polarized light and S polarized light by the PBS (not shown). The P polarized light is rotated by the half-wave retardation plate (not shown) to be converted into S polarized light and combined with the S polarized light resulting from the division of light by the PBS and emitted from the polarization converter 4. The S polarized light exits the polarization converter 4 with its beam width almost twice larger in one direction than the unconverted beam width in the first light pipe 15. The white S polarized light from the polarization converter 4 enters the second light pipe 16 and advances through it while being reflected, and exits the pipe outlet. The width and cross sectional area of the light guide inside the second light pipe 16 are almost twice larger than those of the light guide inside the first light pipe 15 to fit the beam coming from the polarization converter 4. The light emitted from the second light pipe 16 passes through the collimator lens 11a and condenser lens 11b and reaches the dichroic mirrors 5a, 5b, 5c for color separation. First, the red light reflection dichroic mirror 5a reflects the R (red) component of the incident white S polarized light to separate it from the rest of the light; then the blue light reflection dichroic mirror 5b reflects the B (blue) component of the incident S polarized light to separate it from the G (green) component; and lastly the green light reflection dichroic mirror 5c reflects the G (green) component. The R, G, and B light rays as color-separated S polarized light are collimated by the collimator lenses 6a and 6b and sent to a reflective surface of the rotary polyhedral reflector 7. In the rotary polyhedral reflector, while it is rotating, the R, G, and B light rays are reflected by the reflective surfaces on its inner side. The reflected light rays pass through the collimator lenses 6c, 6d, 6e and polarizing plate 13a and enters PBS 8, where the R, G, and B light rays as S polarized light are reflected by the analyzing film 8a and thrown on the reflection type display device 9 through the quarter-wave retardation plate 14. The reflection type display device 9, which is driven by the drive circuit according to an image signal, modulates the incoming R, G and B light rays according to the image signal to convert the S polarized light into P polarized light and emit it as reflected light. The emitted light passes through the quarter-wave retardation plate 14 and again enters PBS 8. In PBS 8, the amount of light emitted to the projection lens 10 and the amount of light emitted to the lamp side are determined according to the relation between the polarization state of incident P polarized light and PBS 8's polarization axis for transmission and reflection. The P polarized light emitted from PBS 8 as combined light enters the projector 10. The P polarized light which has entered the projector 10 is projected on a screen, etc. in enlarged form to project an image according to the above-said image signal.

According to this seventh embodiment, as in the first to sixth embodiments, the apparatus is mainly composed of a rotary polyhedral reflector 7 and one display device 9 so that a simple, compact, low-cost optical unit or image display apparatus can be realized. Since R, G, and B reflected light rays do not cross when R, G, and B light rays are reflected on the same reflective surface in the rotary polyhedral reflector 7, R, G, and B light spots do not overlap on the display device 9, which eliminates wasted light. Therefore, the F number of the optical system need not be small and thus the screen brightness can be increased. In this sense, the optical unit or apparatus can be compact. In addition, light hits and exits the dichroic mirrors 5a, 5b, 5c for color separation at approximately 45 degrees so that the efficiency of color separation can be increased with resultant improvement in contrast and color purity. Especially, in the seventh embodiment, the beam from the first light pipe 15 is widened in one direction so that the beam is almost twice wider when it exits the second light pipe 16; thus it is easy to make strip-shaped color light spots on the display device 9. Also, since the opening of the first light pipe 15 can be shaped and sized to match the cross section of the incoming beam, light loss is minimized and the screen brightness can be increased. Also, adjustment of R, G, and B light projection spots on the display device 9 is no longer needed.

Figure 12A:
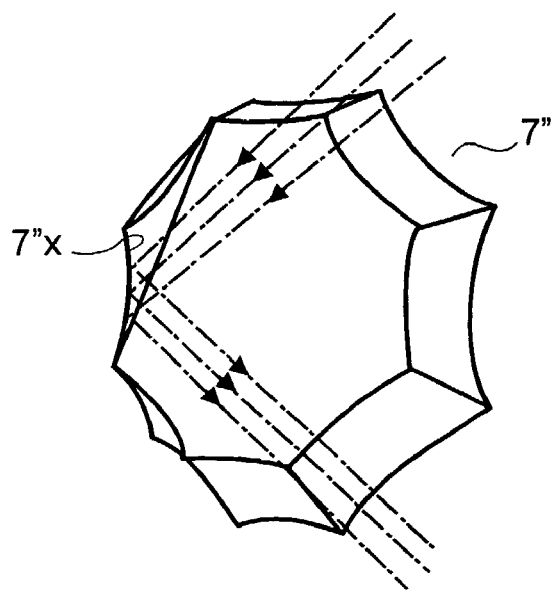
FIG. 12A shows a rotary polyhedral reflector with curved reflective having eight curved reflective surfaces.
Figure 12B:
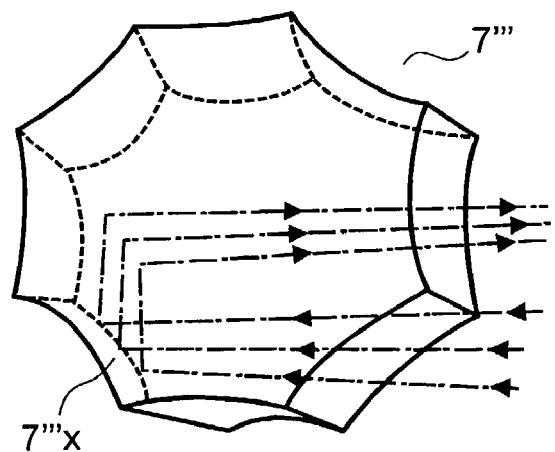
FIG. 12B shows a rotary polyhedral reflector having eight curved reflective surfaces as primary reflective surfaces.

In the above embodiments, the plural reflective surfaces of the rotary polyhedral reflector, which are arranged like a ring around the central axis, are flat and straight planes. However, the present invention is not limited thereto. Alternatively, the reflective surfaces may be curved as shown in FIGS. 12A and 12B. FIG. 12A shows an exemplary reflector having eight curved reflective surfaces $7''x$ around the central axis; and FIG. 12B shows an exemplary reflector having eight curved reflective surfaces $7'''x$ around the central axis as primary reflective surfaces. In these cases, since the reflective surfaces are curved, it is possible to control the scrolling speed of R, G, and B light rays on the display device, for example to make it almost constant. The number of reflective surfaces is not limited to 8. If a secondary reflective surface is provided as in the second embodiment, it need not be perpendicular to the central axis; the number of secondary reflective surfaces is not limited to 1. It is also possible that light is reflected in the rotary polyhedral reflector three times or more. Also, the number of display devices is not limited to 1 though the above embodiments use one display device. A transmission type display device may be used instead of the reflection type display device. The display device may be a reflection type device other than a liquid crystal panel, for example a device which uses small mirrors. A total reflection prism may be used in place of PBS 8. Colors of light reflected by the color separation mirrors are not limited to three colors (R, G, B).

Thus, an optical unit or image display apparatus prevents R, G, and B light spots from overlapping on a display device, eliminates wasted light, thereby improving the utilization ratio of light and the screen brightness. Positional adjustment of R, G and B light spots on the display device is no longer needed and the apparatus can be more compact and less costly.

While the foregoing has described what are considered to be the best mode and/or other preferred embodiments, it is understood that various modifications may be made therein and that the invention or inventions disclosed herein may be implemented in various forms and embodiments, and that they may be applied in numerous appplications, only some of which have been described herein. It is intended by the following claims to claim any and all modifications and variations that fall within the true scope of the inventive concepts.

What is claimed is:

1. A projection type image display apparatus comprising:
   (a) a light source;
   (b) a display device which forms an optical image from light emitted from the light source according to an image signal;
   (c) a color separator which separates light emitted from the light source into light rays of plural colors;
   (d) a rotary polyhedral reflector which has plural reflective surfaces around a central axis, with each angle formed by neighboring reflective surfaces or neighboring reflective surface tangents smaller than 180 degrees on the light entrance/exit side; and, while rotating around the central axis, lets the reflective surfaces sequentially reflect color light rays from the color separator, and emits them to the display device; and
   (e) a projector which projects light rays from the display device as a color image,
   wherein color light rays thrown on the display device from the rotary polyhedral reflector scroll in a prescribed direction on the display device according to changing the reflective surface based on rotation of the rotary polyhedral reflector.

2. The projection type image display apparatus according to claim 1, wherein plural reflective surfaces of the rotary polyhedral reflector are inclined with respect to the central axis.

3. The projection type image display apparatus according to claim 1, wherein plural reflective surfaces of the rotary polyhedral reflector lie around the central axis on its inner side.

4. The projection type image display apparatus according to claim 1, wherein plural reflective surfaces of the rotary polyhedral reflector have almost the same shape.

5. The projection type image display apparatus according to claim 1, wherein color separation surfaces of the color separator are not parallel to each other.

6. The projection type image display apparatus according to claim 1, wherein color separation surfaces of the color separator are parallel to each other and sized and spaced in a way that surface areas on which light rays reflected from them are projected do not overlap.

7. The projection type image display apparatus according to claim 1, wherein the color separator comprises a prism with light-transmitting material between neighboring color separation surfaces.

8. The projection type image display apparatus according to claim 1, wherein the light entrance/exit side reflective surfaces of the rotary polyhedral reflector are convex curved surfaces.

9. A projection type image display apparatus comprising:
   (a) a light source;
   (b) a display device which forms an optical image from light emitted from the light source according to an image signal;
   (c) a color separator which separates light emitted from the light source into light rays of plural colors;
   (d) a rotary polyhedral reflector which has plural primary reflective surfaces and a secondary reflective surface around a central axis, with each angle formed by neighboring primary reflective surfaces or neighboring primary reflective surface tangents smaller than 180 degrees on the light entrance/exit side, and the angle formed by the secondary reflective surface and the primary reflective surfaces smaller than 180 degrees on the light entrance/exit side; and, while rotating around the central axis, lets the primary reflective surfaces and the secondary reflective surface reflect color light rays resultant from the color separator, and emits them to the display device; and
   (e) a projector which projects light rays from the image display device as a color image,
   wherein, color light rays thrown on the display device from the rotary polyhedral reflector scroll in a prescribed direction on the display device according to rotation of the primary and secondary reflective surfaces of the rotary polyhedral reflector.

10. The projection type image display apparatus according to claim 9, wherein primary reflective surfaces and secondary reflective surface are symmetrical with respect to the central axis.

11. The projection type image display apparatus according to claim 9, wherein plural primary reflective surfaces of the rotary polyhedral reflector have almost the same shape.

12. The projection type image display apparatus according to claim 9, wherein color separation surfaces of the color separator are not parallel to each other.

13. The projection type image display apparatus according to claim 9, wherein color separation surfaces of the color separator are parallel to each other and sized and spaced in a way that surface areas on which light rays reflected from them are projected do not overlap.

14. The projection type image display apparatus according to claim 9, wherein the color separator comprises a prism with light-transmitting material between neighboring color separation surfaces.

15. The projection type image display apparatus according to claim 9, wherein the light entrance/exit side reflective surfaces of the rotary polyhedral reflector are convex curved surfaces.

16. A projection type image display apparatus comprising:
   (a) a light source;
   (b) a display device which forms an optical image from light emitted from the light source according to an image signal;
   (c) a first lens array which has plural lenses arranged in a staggered pattern at least vertically or horizontally on a plane for processing light from the light source;
   (d) a second lens array which has plural lenses arranged in a staggered pattern at least vertically or horizontally on a plane and forms a lens image of the first lens array;
   (e) a color separator which separates light from the second lens array into light rays of different colors; and
   (f) a rotary polyhedral reflector which has plural reflective surfaces around a central axis, with the angle formed by neighboring reflective surfaces or neighboring reflective surface tangents smaller than 180 degrees on the light entrance/exit side; and, while rotating around the central axis, lets the reflective surfaces sequentially reflect color light rays from the color separator and emits them to the display device; and
   (g) a projector which projects light rays from the display device as a color image,
   wherein color light rays resultant from color separation by the color separator of light having passed through the first and second lens arrays, scroll in a prescribed direction on the display device according to changing of reflective surface based on rotation of the rotary polyhedral reflector.

17. The projection type image display apparatus according to claim 16, wherein the light entrance/exit side reflective surfaces of the rotary polyhedral reflector are convex curved surfaces.

18. A projection type image display apparatus comprising:
(a) a light source;
(b) a display device which forms an optical image from light emitted from the light source according to an image signal;
(c) a first light pipe which lets incoming light from the light source advance through its inner light guide while being reflected;
(d) a polarization converter which makes the polarization state of light rays from the first light pipe identical;
(e) a second light pipe which has an inner light guide almost twice wider than the light guide of the first light pipe, and lets polarized light from the polarization converter enter and advance through its inner light guide while being reflected;
(f) a color separator which separates light from the second light pipe into light rays of different colors; and
(g) a rotary polyhedral reflector which has plural reflective surfaces around a central axis, with the angle formed by neighboring reflective surfaces or neighboring reflective surface tangents smaller than 180 degrees on the light entrance/exit side; and, while rotating around the central axis, lets the reflective surfaces sequentially reflect color light rays from the color separator, and emits them to the display device; and
(h) a projector which projects light rays from the image display device as a color image,
wherein polarized light having passed through the second light pipe reaches the color separator and is separated into light rays of different colors and the resultant color light rays scroll in a prescribed direction on the display device according to changing of reflective surface based on rotation of the rotary polyhedral reflector.

19. The projection type image display apparatus according to claim 18, wherein the light entrance/exit side reflective surfaces of the rotary polyhedral reflector are convex curved surfaces.

* * * * *